United States Patent
Schissler et al.

(10) Patent No.: US 10,248,744 B2
(45) Date of Patent: Apr. 2, 2019

(54) METHODS, SYSTEMS, AND COMPUTER READABLE MEDIA FOR ACOUSTIC CLASSIFICATION AND OPTIMIZATION FOR MULTI-MODAL RENDERING OF REAL-WORLD SCENES

(71) Applicant: The University of North Carolina at Chapel Hill, Chapel Hill, NC (US)

(72) Inventors: Carl Henry Schissler, Carrboro, NC (US); Dinesh Manocha, Chapel Hill, NC (US)

(73) Assignee: THE UNIVERSITY OF NORTH CAROLINA AT CHAPEL HILL, Chapel Hill, NC (US)

(*) Notice: Subject to any disclaimer, the term of this patent is extended or adjusted under 35 U.S.C. 154(b) by 0 days.

(21) Appl. No.: 15/435,243

(22) Filed: Feb. 16, 2017

(65) Prior Publication Data
US 2018/0232471 A1    Aug. 16, 2018

(51) Int. Cl.
*G06F 17/50* (2006.01)
*G06T 17/20* (2006.01)
(Continued)

(52) U.S. Cl.
CPC ..... *G06F 17/5009* (2013.01); *G06K 9/00201* (2013.01); *G06K 9/00671* (2013.01);
(Continued)

(58) Field of Classification Search
None
See application file for complete search history.

(56) References Cited

U.S. PATENT DOCUMENTS

| 4,908,837 A | 3/1990 | Mori et al. |
| 5,467,401 A | 11/1995 | Nagamitsu et al. |

(Continued)

FOREIGN PATENT DOCUMENTS

WO   WO 2013/184215 A2   12/2013

OTHER PUBLICATIONS

M. Bertram, E. Deines, J. Mohring, J. Jegorovs, and H. Hagen, "Phonon Tracing for Auralization and Visualization of Sound" pp. 1-8, 2005.*

(Continued)

*Primary Examiner* — Kibrom K Gebresilassie
(74) *Attorney, Agent, or Firm* — Jenkins, Wilson, Taylor & Hunt, P.A.

(57) ABSTRACT

Methods, systems, and computer readable media for acoustic classification and optimization for multi-modal rendering of real-world scenes are disclosed. According to one method for determining acoustic material properties associated with a real-world scene, the method comprises obtaining an acoustic response in a real-world scene. The method also includes generating a three-dimensional (3D) virtual model of the real-world scene. The method further includes determining acoustic material properties of surfaces in the 3D virtual model using a visual material classification algorithm to identify materials in the real-world scene that make up the surfaces and known acoustic material properties of the materials. The method also includes using the acoustic response in the real-world scene to adjust the acoustic material properties.

15 Claims, 14 Drawing Sheets

(51) Int. Cl.
*G06T 7/11* (2017.01)
*G06K 9/00* (2006.01)
*G06K 9/46* (2006.01)
*G06K 9/62* (2006.01)
*G06F 3/16* (2006.01)
*H04R 27/00* (2006.01)
*H04S 7/00* (2006.01)
*A63F 13/54* (2014.01)
*H04R 29/00* (2006.01)
*H04R 1/20* (2006.01)

(52) U.S. Cl.
CPC ........... *G06K 9/4628* (2013.01); *G06K 9/627* (2013.01); *G06T 7/11* (2017.01); *G06T 17/20* (2013.01); *A63F 13/54* (2014.09); *G06F 3/165* (2013.01); *G06F 17/5004* (2013.01); *G06F 2217/82* (2013.01); *G06T 2200/04* (2013.01); *G06T 2207/20081* (2013.01); *H04R 1/20* (2013.01); *H04R 27/00* (2013.01); *H04R 29/00* (2013.01); *H04S 7/305* (2013.01); *H04S 2400/11* (2013.01)

(56) References Cited

U.S. PATENT DOCUMENTS

| | | | |
|---|---|---|---|
| 5,771,041 | A | 6/1998 | Small |
| 6,259,452 | B1 | 7/2001 | Coorg et al. |
| 6,751,322 | B1 | 6/2004 | Carlbom et al. |
| 7,027,600 | B1 | 4/2006 | Kaji et al. |
| 7,289,633 | B2 * | 10/2007 | Metcalf .................... H04S 7/30 359/901 |
| 7,319,760 | B2 | 1/2008 | Sekine et al. |
| 7,394,904 | B2 | 7/2008 | Bruno et al. |
| 7,463,740 | B2 | 12/2008 | Kushida |
| 7,480,386 | B2 | 1/2009 | Ogata |
| 7,809,453 | B2 | 10/2010 | Reichelt et al. |
| 7,930,048 | B2 | 4/2011 | Reichelt et al. |
| 8,029,363 | B2 | 10/2011 | Radek et al. |
| 8,133,117 | B2 | 3/2012 | Ueda et al. |
| 8,214,179 | B2 | 7/2012 | Carlbom et al. |
| 8,249,283 | B2 | 8/2012 | Ando et al. |
| 8,466,363 | B2 | 6/2013 | Tsuchida |
| 8,615,090 | B2 | 12/2013 | Son et al. |
| 8,634,578 | B2 | 1/2014 | Vickers |
| 8,847,965 | B2 | 9/2014 | Chandak et al. |
| 8,958,567 | B2 | 2/2015 | Tsingos et al. |
| 9,113,280 | B2 | 8/2015 | Cho et al. |
| 9,189,915 | B2 | 11/2015 | Timperley |
| 9,401,684 | B2 * | 7/2016 | Ren ........................... G10H 1/10 |
| 9,510,125 | B2 | 11/2016 | Raghuvanshi et al. |
| 9,711,126 | B2 | 7/2017 | Mehra et al. |
| 9,977,644 | B2 | 5/2018 | Schissler et al. |
| 2001/0043738 | A1 | 11/2001 | Sawhney et al. |
| 2003/0052875 | A1 | 3/2003 | Salomie |
| 2005/0281410 | A1 | 12/2005 | Grosvenor et al. |
| 2006/0116781 | A1 | 6/2006 | Blesser |
| 2006/0126878 | A1 | 6/2006 | Takumai et al. |
| 2006/0247918 | A1 | 11/2006 | Schmidt et al. |
| 2006/0290695 | A1 | 12/2006 | Salomie |
| 2007/0036432 | A1 | 2/2007 | Xu et al. |
| 2008/0037796 | A1 | 2/2008 | Jot et al. |
| 2008/0232602 | A1 | 9/2008 | Shearer |
| 2008/0240448 | A1 | 10/2008 | Gustafsson et al. |
| 2008/0249750 | A1 * | 10/2008 | Mao ..................... G06F 17/5009 703/2 |
| 2009/0046864 | A1 | 2/2009 | Mahabub et al. |
| 2009/0262604 | A1 | 10/2009 | Funada |
| 2010/0142733 | A1 | 6/2010 | Choi et al. |
| 2010/0208905 | A1 | 8/2010 | Franck et al. |
| 2011/0017545 | A1 | 1/2011 | Pompei |
| 2011/0081023 | A1 | 4/2011 | Raghuvanshi et al. |
| 2011/0222372 | A1 | 9/2011 | O'Donovan et al. |
| 2011/0249825 | A1 | 10/2011 | Ise |
| 2012/0007940 | A1 | 1/2012 | Michrowski et al. |
| 2012/0016640 | A1 | 1/2012 | Murphy |
| 2012/0101609 | A1 | 4/2012 | Supper et al. |
| 2012/0249556 | A1 * | 10/2012 | Chandak .............. G06F 17/5009 345/473 |
| 2012/0269355 | A1 | 10/2012 | Chandak et al. |
| 2012/0288114 | A1 | 11/2012 | Duraiswami et al. |
| 2012/0307880 | A1 | 12/2012 | Horbach et al. |
| 2013/0002672 | A1 | 1/2013 | Peterson et al. |
| 2013/0207976 | A1 | 8/2013 | Jenkins |
| 2013/0236040 | A1 * | 9/2013 | Crawford ................ H04S 7/304 381/310 |
| 2013/0272548 | A1 | 10/2013 | Visser et al. |
| 2013/0282388 | A1 | 10/2013 | Engdegard |
| 2014/0025386 | A1 | 1/2014 | Xiang et al. |
| 2014/0161268 | A1 | 6/2014 | Antani et al. |
| 2015/0057083 | A1 | 2/2015 | Mehra et al. |
| 2015/0294041 | A1 | 10/2015 | Yeh et al. |
| 2015/0332680 | A1 | 11/2015 | Crockett et al. |
| 2015/0378019 | A1 | 12/2015 | Schissler et al. |
| 2016/0034248 | A1 | 2/2016 | Schissler et al. |
| 2018/0121580 | A1 * | 5/2018 | Tsang .................. G06F 17/5018 |

OTHER PUBLICATIONS

C. L. Christensen, G. Koutsouris, and J. H. Rindel, "Estimating absorption of materials to match room model against existing room using a genetic algorithm", pp. 1-9, 2014.*

M. Cimpoi, S. Maji, and A. Vedaldi, "Deep filter banks for texture recognition and segmentation", pp. 1-9, 2015.*

Härmä et al. "Augmented Reality Audio for Mobile and Wearable Appliances," Journal of the Audio Engineering Society, vol. 52, No. 6, pp. 618-639 (2004).

Larsson et al., "Auditory-induced presence in mixed reality environments and related technology," in The Engineering of Mixed Reality Systems. Springer, pp. 1-23 (2010).

Seddeq, "Factors influencing acoustic performance of sound absorptive materials," Australian Journal of Basic and Applied Science, vol. 3, No. 4, pp. 4610-4517 (2009).

Rindel et al., "Odeon, a design tool for noise control in indoor environments," in Proceedings of the International Conference Noise at work. Lille, pp. 1-9 (2007).

Thompson, "A review of finite-element methods for time-harmonic acoustics," J. Acoust. Soc. Am, vol. 119, No. 3, pp. 1315-1330 (2006).

Raghuvanshi et al., "Efficient and accurate sound propagation using adaptive rectangular decomposition," Visualization and Computer Graphics, IEEE Transactions on, vol. 15, No. 5, pp. 789-801 (2009).

Mehra et al., "Wave-based sound propagation in large open scenes using an equivalent source formulation," ACM Transactions on Graphics (TOG), vol. 32, No. 2, pp. 1-12 (2013).

Raghuvanshi et al., "Precomputed wave simulation for real-time sound propagation of dynamic sources in complex scenes," ACM Transactions on Graphics (TOG), vol. 29, No. 4. ACM, pp. 1-11 (2010).

Borish, "Extension to the image model to arbitrary polyhedra," The Journal of the Acoustical Society of America, vol. 75, No. 6, pp. 1827-1836 (Jun. 1984).

Funkhouser et al., "A beam tracing approach to acoustic modeling for interactive virtual environments," in Proc. of ACM SIGGRAPH, pp. 1-12 (1998).

Taylor et al., "Resound: interactive sound rendering for dynamic virtual environments," in MM '09 Proceedings of the seventeen ACM international conference on Multimedia. ACM, pp. 1-10 (2009).

M. Vorländer, "Simulation of the transient and steady-state sound propagation in rooms using a new combined ray-tracing/image-source algorithm," The Journal of the Acoustical Society of America, vol. 86, No. 1, pp. 172-178 (1989).

Embrechts, "Broad spectrum diffusion model for room acoustics raytracing algorithms," The Journal of the Acoustical Society of America, vol. 107, No. 4, pp. 2068-2081 (2000).

(56) References Cited

OTHER PUBLICATIONS

Schissler et al., "High-order diffraction and diffuse reflections for interactive sound propagation in large environments," ACM Transactions on Graphics (SIGGRAPH 2014), vol. 33, No. 4, pp. 1-12 (2014).
Tsingos et al., "Modeling acoustics in virtual environments using the uniform theory of diffraction," in Proc. of ACM SIGGRAPH, pp. 545-553 (2001).
Svensson et al., "An analytic secondary source model of edge diffraction impulse responses," Acoustical Society of America Journal, vol. 106, pp. 2331-2344 (Nov. 1999).
Mückl et al., "Precomputing sound scattering for structured surfaces," in Proceedings of the 14th Eurographics Symposium on Parallel Graphics and Visualization, pp. 1-8 (2014).
ISO, "ISO 354, Acoustics—Measurement of sound absorption in a reverberation room." International Standards Organisation, 2nd Edition, No. 354, pp. 1-21 (2003).
Christensen et al., "A new scattering method that combines roughness and diffraction effects," in Forum Acousticum, Budapest, Hungary, pp. 1-6 (2005).
Monks et al., "Audioptimization: goal-based acoustic design," Laboratory for Computer Science, Massachusetts Institute of Technology, 32 pages, (Sep. 1998).
K. Saksela, J. Botts, and L. Savioja, "Optimization of absorption placement using geometrical acoustic models and least squares," The Journal of the Acoustical Society of America, vol. 137, No. 4, pp. EL274-EL280 (2015).
Nava, "Inverse sound rendering: In-situ estimation of surface acoustic impedance for acoustic simulation and design of real indoor environments," Ph.D. dissertation, Graduate School of Information Science and Technology, University of Tokyo, pp. 1-111 (2007).
Christensen et al., "Estimating absorption of materials to match room model against existing room using a genetic algorithm," in Forum Acusticum 2014, At Krakow, Poland, pp. 1-10 (2014).
Chen et al., "3D indoor scene modeling from rgb-d data: a survey," Computational Visual Media, vol. 1, No. 4, pp. 267-278, (2015).
Batlle et al., "Recent progress in coded structured light as a technique to solve the correspondence problem: a survey," Pattern recognition, vol. 31, No. 7, pp. 963-982, (1998).
Scharstein et al., "High-accuracy stereo depth maps using structured light," in IEEE Computer Vision and Pattern Recognition., vol. 1. IEEE, pp. 195-202 (2003).
Newcombe et al., "KinectFusion: Real-time dense surface mapping and tracking," in Mixed and augmented reality (ISMAR), 2011 10th IEEE international symposium on. IEEE, pp. 1-10 (2011).
Dou et al., "Exploring high-level plane primitives for indoor 3D reconstruction with a hand-held RGB-D camera," in Computer Vision—ACCV 2012 Workshops. Springer, pp. 94-108 (2013).
Liu et al., "Rent3D: Floor-plan priors for monocular layout estimation," in Proceedings of the IEEE Conference on Computer Vision and Pattern Recognition, pp. 3413-3421 (2015).
Sormann et al., "Watertight multi-view reconstruction based on volumetric graph-cuts," in Image analysis. Springer, pp. 393-402 (2007).
Bao et al., "Understanding the 3D layout of a cluttered room from multiple images," in Applications of Computer Vision (WACV), 2014 IEEE Winter Conference on. IEEE, pp. 1-8 (2014).
Siltanen et al., "Geometry reduction in room acoustics modeling," Acta Acustica united with Acustica, vol. 94, No. 3, pp. 410-418 (2008).
Pelzer et al., "Frequency-and time-dependent geometry for real-time auralizations," in Proceedings of 20th International Congress on Acoustics, ICA, pp. 1-7 (2010).
Liu et al., "Exploring features in a bayesian framework for material recognition," in Computer Vision and Pattern Recognition (CVPR), 2010 IEEE Conference, pp. 1-8 (2010).
Hu et al., "Toward Robust Material Recognition for Everyday Objects." in BMVC, vol. 13, pp. 1-11 (2011).
Cimpoi et al., "Deep convolutional filter banks for texture recognition and segmentation," arXiv preprint arXiv:1411.6836, pp. 1-10 (2014).
Bell et al., "Material Recognition in the Wild with the Materials in Context Database," Computer Vision and Pattern Recognition (CVPR), pp. 3479-3487 (2015).
Szegedy et al., "Going Deeper with Convolutions," in the IEEE Conference on Computer Vision and Pattern Recognition (CVPR), pp. 1-9 (Jun. 2015).
Achanta et al., "SLIC Superpixels Compared to State-of-the-art Superpixel Methods," Journal of Latex Class Files, vol. 6, No. 1, pp. 1-8 (Dec. 2011).
Wang et al., "A Hole-Filling Strategy for Reconstruction of Smooth Surfaces in Range Images," in XVI Brazilian Symposium on Computer Graphics and Image Processing, SIBGRAPI 2003, IEEE, pp. 1-9 (2003).
Branch et al., "Automatic hole-filling of triangular meshes using local radial basis function," in 3D Data Processing, Visualization, and Transmission, Third International Symposium on. IEEE, pp. 1-8 (2006).
Jia et al., "Caffe: Convolutional Architecture for Fast Feature Embedding," in Proceedings of the 22nd ACM International Conference on Multimedia, pp. 1-4 (2014).
Pulkki, Spatial sound generation and perception by amplitude panning techniques. Helsinki University of Technology, Report 62, pp. 1-59 (2001).
Wenzel et al., "A software-based system for interactive spatial sound synthesis," in ICAD, 6th Intl. Conf. on Aud. Disp, pp. 1-6 (2000).
Foster, "Impulse response measurement using golay codes," in Acoustics, Speech, and Signal Processing, IEEE International Conference on ICASSP'86., vol. 11. IEEE, pp. 929-932 (1986).
Non-Final Office Action for U.S. Appl. No. 14/812,785 (dated Apr. 13, 2017).
Notice of Allowance and Fee(s) Due for U.S. Appl. No. 14/387,127 (dated Mar. 13, 2017).
Calamia et al., "Fast Time-Domain Edge-Diffraction Calculations for Interactive Acoustic Simulations," EURASIP Journal on Advances in Signal Processing, pp. 1-10 (Oct. 16, 2006).
Gumerov, et al., "A broadband fast multipole accelerated boundary element method for the three-dimensional Helmholtz equation," Journal of the Acoustical Society of America, vol. 125, Issue 1, pp. 191-205, (2009).
Non-Final Office Action for U.S. Appl. No. 14/329,251 (dated March 14, 2017).
"Nvidia occlusion query," http://oss.sgi.com/projects/ogl-sample/registry/NV/occlusion_query.txt (2002).
Abramowitz et al, "Handbook of Mathematical Functions," 5th ed. Dover, New York (1964).
Akenine-Moller et al., "Conservative and Tiled Rasterization Using a Modified Triangle Setup," Journal of Graphics Tools, vol. 10, No. 3, pp. 1-7 (2005).
Alarcao, et al., "An auralization system for real time room acoustics simulation," Proceedings of Tecniacustica, (2009).
Allen, et al., "Image method for efficiently simulating small-room acoustics," The Journal of the Acoustical Society of America, vol. 65, Issue 4 (April), pp. 943-950, (1979).
Antani et al., "Direct-to-Indirect Acoustic Radiance Transfer," IEEE Transactions on Visualization and Computer Graphics, vol. 18, No. 2, pp. 261-269 (Feb. 2012).
Antani et al., "Interactive Sound Propagation Using Compact Acoustic Transfer Operators," ACM Transactions on Graphics, vol. 31, No. 1, Article 7, pp. 7:1-7:12 (Jan. 2012).
Antani, et al., "Aural proxies and directionally-varying reverberation for interactive sound propagation in virtual environments," Visualization and Computer Graphics, IEEE Transactions, vol. 19, Issue 4, pp. 218-233, (2013).
Antani, et al., "Efficient finite-edge diffraction using conservative from-region visibility," Applied Acoustics, vol. 73, pp. 218-233, (2012).
Antani, Lakulish, "Acoustic Simulation," 55 pages, (Apr. 9, 2009).

(56) References Cited

OTHER PUBLICATIONS

Antonacci et al., "Fast Modeling of Acoustic Reflections and Diffraction in Complex Environments Using Visibility Diagrams," Proceedings of 12th European Signal Processing Conference, pp. 1773-1776 (2004).
Applicant Initiated Interview Summary for U.S. Appl. No. 14/387,127 (Feb. 17, 2017).
Aretz, "Combined Wave and Ray Based Room Acoustic Simulations of Small Rooms: Challenges and limitations on the way to realistic simulation results," Ph.D. Thesis, Aachener Beiträge zur Technischen Akustik (Sep. 2012).
Arfken, George B. and Weber, Hans J., "Essential Mathematical Methods for Physicists," (1985).
Arvo et al., "A Survey of Ray Tracing Acceleration Techniques," An Introduction to Ray Tracing, pp. 201-262 (1989).
Barbone et al., "Scattering by a hybrid asymptotic/finite element method," Computer Methods in Applied Mechanics and Engineering, vol. 164, No. 1, pp. 141-156 (1998).
Battenberg et al., "Implementing Real-Time Partitioned Convolution Algorithms on Conventional Operating Systems," Proceedings of the 14th International Conference on Digital Audio Effects, Paris, France (2011).
Begault, "3-D Sound for Virtual Reality and Multimedia," NASA/TM-2000-000000, pp. 1-246 (Apr. 2000).
Ben-Artzi et al., "A Precomputed Polynomial Representation for Interactive BRDF Editing with Global Illumination," ACM Transactions on Graphics, pp. 1-10 (2008).
Bertram, et al., "Phonon tracing for auralization and visualization of sound," Proceedings of IEEE Visualization, pp. 151-158, (2005).
Biot et al., "Formulation of Wave Propagation in Infinite Media by Normal Coordinates with an Application to Diffraction," The Journal of the Acoustical Society of America, vol. 29, No. 3, pp. 381-391 (Mar. 1957).
Bittner et al., "Adaptive Global Visibilty Sampling," SIGGRAPH '09: ACM SIGGRAPH, pp. 1-10 (2009).
Bittner et al., "Fast Exact From-Region Visibility in Urban Scenes," Eurographics Symposium on Rendering, pp. 1-9 (2005).
Bittner et al., "Hierarchical Visibility Culling with Occlusion Trees," Proceedings of Computer Graphics International, pp. 207-219 (Jun. 1998).
Bittner et al., "Visibility in Computer Graphics," Environment and Planning B: Planning and Design, vol. 30, pp. 729-756 (2003).
Blauert, "Spatial Hearing: The Psychophysics of Human Sound Localization," MIT Press, pp. 334-335 (1983).
Botteldooren, D. 1994. Acoustical finite-difference time-domain simulation in a quasi-Cartesian grid. The Journal of the Acoustical Society of America 95, 2313.
Calamia et al., "Diffraction culling for virtual-acoustic simulations," The Journal of the Acoustical Society of America, pp. 2586-2586 (2009).
Calamia et al., "Edge Subdivision for Fast Diffraction Calculations," 2005 IEEE Workshop on Applications of Signal Processing to Audio and Acoustics, pp. 187-190 (2005).
Calamia et al., "Fast Time-Domain Edge-Diffraction Calculations for Interactive Acoustic Simulations," EURASIP Journal on Advances in Signal Processing, vol. 2007, Article 63560, pp. 1-33 (2007)
Calamia et al., "Integration of edge diffraction calculations and geometrical-acoustics modeling," Proceedings of Forum Acusticum, pp. 1-6 (2005).
Case, K, "Structural Acoustics: a General Form of Reciprocity Principles in Acoustics," Technology Reports, JSR-92-193, The MITRE Corporation (Jan. 1993).
Chambers et al., "Time-domain experiments on the diffraction of sound by a step discontinuity," Journal of the Acoustical Society of America, vol. 96, No. 3, pp. 1887-1892 (Sep. 1994).
Chandak et al., "AD-Frustum: Adaptive Frustum Tracing for Interactive Sound Propagation," IEEE Transactions on Visualization and Computer Graphics, vol. 14, No. 6, pp. 1707-1714 (Nov./Dec. 2008).
Chandak, et al., "FastV: From-point visibility culling on complex models," Computer Graphics Forum (Proc. of EGSR), vol. 28, Issue 3, pp. 1237-1247, (2009).
Cheng et al., "Heritage and Early History of the Boundary Element Method," Engineering Analysis with Boundary Elements, vol. 29, No. 3, pp. 268-302 (Mar. 2005).
Chhugani et al., "vLOD: High-Fidelity Walkthrough of Large Virtual Environments," IEEE Transactions on Visualization and Computer Graphics, vol. 11, No. 1, pp. 35-47 (Jan./Feb. 2005).
Christensen et al., "Danish Acoustical Society Round Robin on Room Acoustic Computer Modeling," Odeon A/S: Lyngby, Denmark (2008).
Christensen et al., Odeon Manual, Chapter 6 (2013).
Cohen-Or et al., "A Survey of Visibility for Walkthrough Applications," IEEE Transactions on Visualization and Computer Graphics, vol. 9, No. 3, pp. 412-431 (Jul.-Sep. 2003).
Coorg et al., "Real-Time Occlusion Culling for Models with Large Occluders," Symposium on Interactive 3D Graphics, pp. 83-90 (Apr. 1997).
Dalenbäck et al., "A Macroscopic View of Diffuse Reflection," J. Audio Eng. Soc., vol. 42, No. 10, pp. 793-807 (Oct. 1994).
Dalenback, "Room acoustic prediction based on a unified tretment of diffuse and specular reflection," The Journal of the Acoustical Society of America, vol. 100, No. 2, Pt. 1, pp. 899-909 (Aug. 1996).
Doicu et al, "Acoustic and Electromagnetic Scattering Analysis Using Discrete Sources," 1st ed. Academic Press (Jul. 2000).
Dross, et al., "A fast reverberation estimator for virtual environments," Audio Engineering Society 30th International Conference, pp. 99-108 (Mar. 2007).
Duguet et al., "Robust Epsilon Visibility," Proc. of ACM SIGGRAPH, pp. 567-575 (2002).
Durand et al., "Conservative Visibility Preprocessing Using Extended Projections," SIGGRAPH '00: Proceedings of the 27th Annual Conference on Computer Graphics and Interactive Techniques, pp. 1-13 (2000).
Durand et al., "The 3d visibility complex: a new approach to the problems of accurate visibility," Proceedings of the Eurographics Workshop on Rendering Techniques '96, pp. 245-256 (1996).
Durand et al., "The Visibility Skeleton: A Powerful and Efficient Multi-Purpose Global Visibility Tool," SIGGRAPH '97: Proceedings of the 24th Annual Conference on Computer Graphics and Interactive Techniques, pp. 89-100 (1997).
Durand, "3D Visibility: Analytical Study and Applications," pp. 1-305 (1999).
Economou, et al., "The significance of sound diffraction effects in predicting acoustics in ancient theatres," Acta Acustica united with Acustica, vol. 99, Issue 1, pp. 48-57, (2013).
Eyring, C. F, "Reverberation time in "dead" rooms," The Journal of the Acoustical Society of America, vol. 1, Issue 2A (January), pp. 217-241, (1930).
Fairweather et al., "The Method of Fundamental Solutions for Scattering and Radiation Problems," Engineering Analysis with Boundary Elements, vol. 27, No. 7, pp. 759-769 (Jul. 2003).
Final Office Action for U.S. Appl. No. 13/373,901 (dated Jan. 14, 2014).
Fouad et al., "Perceptually Based Scheduling Algorithms for Real-Time Synthesis of Complex Sonic Environments," Proceedings of International Conference on Auditory Display (1997).
Franzoni, et al., "An acoustic boundary element method based on energy and intensity variables for prediction of high-frequency broadband sound fields," The Journal of the Acoustical Society of America, vol. 110. Article 3071, (2001).
Funkhouser et al., "A beam tracing method for interactive architectural acoustics," Journal of Acoustical Society of America, vol. 115, No. 2, pp. 739-756 (Feb. 2004).
Funkhouser et al., "Survey of Methods for Modeling Sound Propagation in Interactive Virtual Environment Systems," Presence, pp. 1-53 (2004).
Gallo et al., "Efficient 3D Audio Processing on the GPU," ACM Workshop on General Purpose Computing on Graphics Processors (2004).

(56) References Cited

OTHER PUBLICATIONS

Garland, et al., "Surface simplification using quadric error metrics," Proceedings of the 24th annual conference on Computer graphics and interactive techniques, ACM Press/Addison-Wesley Publishing Company, pp. 209-216, (1997).
Geringer et al., "High School String Players Perception of Violin, Trumpet, and Voice Intonation," String Research Journal, vol. 3, pp. 81-96 (2012).
Ghali, "A Survey of Practical Object Space Visibility Algorithms," SIGGRAPH, pp. 1-14 (2001).
Gigus et al., "Efficiently Computing and Representing Aspect Graphs of Polyhedral Objects," IEEE Transactions on Pattern Analysis Machine Intelligence, vol. 13, No. 6, pp. 542-551 (Jun. 1991).
Granier et al., "Experimental auralization of car audio installations," Journal of the Audio Engineering Society, vol. 44, No. 10, pp. 835-849 (Oct. 1996).
Griesinger, David, "The Importance of the Direct to Reverberant Ratio in the Perception of Distance, Localization, Clarity, and Envelopment," Audio Engineering Society Convention, vol. 126, Audio Engineering Society (2009).
Gumerov et al., "A Broadband Fast Multipole Accelerated Boundary Element Method for the 3D Helmholtz Equation," The Journal of the Acoustical Society of America, vol. 125, No. 1, pp. 1-46 (2008).
Hampel et al., "Coupling boundary elements to a raytracing procedure," International Journal for Numerical Methods in Engineering, vol. 73, No. 3, pp. 427-445 (2008).
Hasenfratz et al., "A Survey of Real-Time Soft Shadows Algorithms," Eurographics, vol. 22, No. 4, pp. 753-774 (2003).
Heckbert et al., "Beam Tracing Polygonal Objects," Proc. of ACM SIGGRAPH, pp. 1-23 (1984).
Herder, Jens, "Optimization of Sound Spatialization Resource Management Through Clustering," The Journal of Three Dimensional Images, 3D-Forum Society, vol. 13, pp. 59-65 (1999).
Huang, et al., "An accurate method for voxelizing polygon meshes," Volume Visualization, 1998. IEEE Symposium on, IEEE, pp. 119-126, (1998).
Hudson et al., "Accelerated Occlusion Culling using Shadow Frusta," Proc. of ACM Symposium on Computational Geometry, pp. 1-10 (1997).
James, et al., "Precomputed acoustic transfer: output-sensitive, accurate sound generation for geometrically complex vibration sources," Proceedings of ACM SIGGRAPH, pp. 987-995, (2006).
Jean et al., "Calculation of Tyre Noise Radiation with a Mixed Approach," Acta Acustica united with Acustica, vol. 94, No. 1, pp. 1-6 (2008).
Kajiya, "The Rendering Equation," Proc. of ACM SIGGRAPH, vol. 20, No. 4, pp. 143-150 (1986).
Kapralos et al., "Sonel Mapping: Acoustic Modeling Utilizing an Acoustic Version of Photon Mapping," IEEE International Workshop on Haptics Audio Visual Environments and their Application, pp. 2-3 (2004).
Klosowski et al., "The Prioritized-Layered Projection Algorithm for Visible Set Estimation," IEEE Transactions on Visualization and Computer Graphics, vol. 6, No. 2, pp. 108-123 (Apr.-Jun. 2000)
Koltun et al., "Hardware-accelerated from-region visibility using a dual ray space," Proceedings of the 12th Eurographics Workshop on Rendering Techniques, pp. 205-216 (2001).
Koltun et al., "Selecting Effective Occluders for Visibility Culling," Eurographics , pp. 1-5 (2000).
Koltun et al., "Virtual Occluders: An Efficient Intermediate PVS Representation," Eurographics Workshop on Rendering, pp. 1-12 (2000).
Kouyoumjian, et al., "A uniform geometrical theory of diffraction for an edge in a perfectly conducting surface," Proceedings of the IEEE, vol. 62, Issue 11, pp. 1448-1461, (1974).
Krivanek, et al., "Practical Global Illumination with Irradiance Caching," ACM SIGGRAPH Course Notes, (2008).
Krokstad, et al., "Calculating the acoustical room response by the use of a ray tracing technique," Journal of Sound and Vibration, vol. 8, Issue 1 (July), pp. 118-125, (1968).
Kropp et al, "Application of the Time Domain Firmulation of the Method of Equivalent Sources to Radiation and Scattering Problems," Acta Acustica united with Acustica, vol. 81, No. 6, pp. 528-543 (1995).
Kulp, Barry D., "Digital Equalization Using Fourier Transform Techniques," Audio Engineering Society Convention, vol. 85, Audio Engineering Society (1988).
Kuttruff, H., "A simple iteration scheme for the computation of decay constants in enclosures with diffusely reflecting boundaries," The Journal of the Acoustical Society of America, vol. 98, Issue 1, pp. 288-293, (1995).
Laine et al., "Accelerated beam tracing algorithm," Applied Acoustics, No. 70, pp. 172-181 (2009).
Laine, "An Incremental Shaft Subdivision Algorithm for Computing Shadows and Visibility," Master's Thesis, Helsinki University of Technology (Mar. 29, 2006).
Lauterbach et al., "Adaptive sampling for frustum-based sound propagation in complex and dynamic environments," Proceedings of the 19th International Congress on Acoustics, pp. 1-6 (Sep. 2007).
Lauterbach et al., "Interactive Sound Rendering in Complex and Dynamic Scenes sing Frustum Tracing," IEEE Transactions on Visualization and Computer Graphics, vol. 13, No. 6, pp. 1672-1679 (Nov.-Dec. 2007).
Law et al., "Preprocessing Occlusion for Real-Time Selective Refinement," 1999 Symposium on Interactive 3D Graphics, pp. 47-53 (1999).
Lehnert, "Systematic Errors of the Ray-Tracing Algorithm," Applied Acoustics, vol. 38, pp. 207-221 (1993).
Lehtinen, "Time-domain Numerical Solution of the Wave Equation," pp. 1-17 (Feb. 6, 2003).
Lensch et al., "FastV: From-point Visibility Culling on Complex Models," Eurographics Symposium on Rendering, vol. 28, No. 4, pp. 1-8 (2009).
Lentz, et al., "Virtual reality system with integrated sound field simulation and reproduction," EURASIP Journal on Advances in Signal Processing 2007 (January), pp. 187-187, (2007).
Leyvand et al., "Ray Space Factorization for From-Region Visibility," ACM Transactions on Graphics, pp. 595-604 (Jul. 2003)
Liu et al, "Development of the Fast Multipole Boundary Element Method for Acoustic Wave Problems," Recent Advances in Boundary Element Methods, pp. 287-303 (2009).
Liu, "The PTSD Algorithm: A Time-Domain Method Combining the Pseudospectral Technique and Perfectly Matched Layers," The Journal of the Acoustical Society of America, vol. 101, No. 5, p. 3182 (1997).
Lloyd et al., "Warping and Partitioning for Low Error Shadow Maps," Proceedings of the Eurographics Symposium on Rendering, pp. 1-13 (2006).
Lokki et al., "Studies of Epidaurus with a Hybrid Room Acoustics Modelling Method," In the Acoustics of Ancient Theatres Conference, Greece, pp. 1-6 (Sep. 2011).
Lorensen, et al., "Marching cubes: A high resolution 3d surface construction algorithm," ACM Siggraph Computer Graphics, vol. 21, ACM, pp. 163-169, (1987).
Luebke et al., "Portals and Mirrors: Simple, Fast Evaluation of Potentially Visibile Sets," ACM Interactive 3D Graphics Conference, pp. 105-108 (1995).
Mattausch et al., "CHC++: Coherent Hierarchical Culling Revisited," Proc. of Eurographics Workshop on Rendering, vol. 27, No. 3, pp. 221-230 (2008).
Medwin et al., "Impulse studies of double diffraction: A discrete Huygens interpretation," The Journal of the Acoustical Society of America, pp. 1005-1013 (Sep. 1982).
Moeck, et al., "Progressive perceptual audio rendering of complex scenes," Proceedings of Symposium on Interactive 3D graphics and games, ACM, pp. 189-196, (2007).
Müller-Tomfelde, Christian, "Time-Varying Filter In Non-Uniform Block Convolution," Proceedings of the COST G-6 Conference on Digital Audio Effects (2001).

(56) References Cited

OTHER PUBLICATIONS

Murphy et al., "Hybrid Room Impulse Response Synthesis in Digital Waveguide Mesh Based Room Acoustics Simulation," In Proceedings of the 11th International Conference on Digital Audio Effects (DAFx-OS), pp. 1-8 (Sep. 2008).
Navazo et al., "ShieldTester: Cell-to-cell visibility test for surface occluders," Proc. of Eurographics, pp. 291-302 (2003).
Nirenstein et al., "Exact From-Region Visibility Culling," Thirteenth Eurographics Workshop on Rendering, pp. 191-202 (2002).
Nirenstein et al., "Hardware Accelerated Visibility Preprocessing using Adaptive Sampling," Eurographics Symposium on Rendering (2004).
Nirenstein, "Fast and Accurate Visibility Preprocessing," Dissertation, University of Cape Town, South Africa (2003).
Nironen, H, "Diffuse Reflections in Room Acoustics Modelling," PhD thesis, Helsinki University of Technology, (2004).
Non Final Office Action for U.S. Appl. No. 14/387,127 (dated Nov. 4, 2016).
Non-Final Office Action for U.S. Appl. No. 13/373,901 (dated Sep. 11, 2013).
Nooruddin, el at., "Simplification and repair of polygonal models uing volumetric techniques," Visualization and Computer Graphics, IEEE Transactions, vol. 9, Issue 2, pp. 191-205, (2003).
Notice of Allowance and Fee(s) Due for U.S. Appl. No. 13/373,901 (dated May 28, 2014).
Notice of Allowance and Fee(s) Due for U.S. Appl. No. 14/187,127 (dated Mar. 13, 2017).
Notification of Transmittal of the International Search Report and the Written Opinion of the International Searching Authority, or the Declaration for International Application No. PCT/US2013/031619 (dated Dec. 24, 2013).
Ochmann, "The Full-Fled Equations for Acoustic Radiation and Scattering," The Journal of the Acoustical Society of America, vol. 105, No. 5, pp. 2574-2584 (1999).
Ochmann, "The source simulation technique for acoustic radiation problems," Acta Acustica united with Acustica, vol. 81, No. 6, pp. 512-527 (1995).
Overbeck et al., "A Real-time Beam Tracer with Application to Exact Soft Shadows," Eurographics Symposium on Rendering, pp. 85-98 (Jun. 2007).
Owens et al., "A Survey of General-Purpose Computation on Graphics Hardware," Computer Graphics Forum, vol. 26, No. 1, pp. 80-113 (2007).
Pavic, "A Technique for the Computation of Sound Radiation by Vibrating Bodies Using Substitute Sources," Acta Acustica united with Acustica, vol. 92, pp. 112-126 (2006).
Pierce, "Acoustics: An Introduction to its Physical Principles and Applications," The Journal of the Acoustical Society of America, vol. 70(5), pp. 1548 (1981).
Pulkki et al, "Implementation and visualization of edge diffraction with image source method," In Proceedings of the 112th AES Convention, pp. 1-13 (May 10-13, 2002).
Pulkki et al., "Visualization of edge diffraction," Acoustics Research Letters Online, vol. 4, No. 4, pp. 118-123 (2002).
Pulkki, Ville, "Virtual Sound Source Positioning using Vector Base Amplitude Panning," Journal of the Audio Engineering Society, vol. 45, Issue 6, pp. 456-466 (1997).
Raghuvanshi et al., "Accelerated Wave-Based Acoustics Simulation," SPM '08: Proceedings of the 2008 ACM Symposium on Solid and Physical Modeling, pp. 91-102 (2008).
Reshetov et al., "Multi-Level Ray Tracing Algorithm," ACM Trans. Graph., pp. 1176-1185 (2005).
Restriction and/or Election Requirement for U.S. Appl. No. 14/754,155 (dated Jan. 13, 2017).
Rindel, et al., "Room Acoustic Simulation and Auralization—How Close can we get to the Real Room?," Proceedings of 8th Western Pacific Acoustics Conference, Melbourne (2003).
Sakamoto et al, "Numerical Analysis of Sound Propagation in Rooms Using the Finite Difference Time Domain Method," The Journal of the Acousitcal Society of America, vol. 120, No. 5, p. 3008 (2006).
Savioja, et al., "Auralization Applying the Parametric Room Acoustic Modeling Technique—The Diva Auralization System," 8th International Conference on Auditory Display, pp. 219-224, (2002).
Savioja, et al., "Creating Interactive Virtual Acoustic Environments," Journal of the Audio Engineering Society (JAES), vol. 47, Issue 9, pp. 675-705 (1999).
Savioja, L, "Real-Time 3D Finite-Difference Time-Domain Simulation of Mid-Frequency Room Acoustics," 13th International Conference on Digital Audio Effects, DAFx-10, (2010).
Schaufler et al., "Conservative Volumetric Visibility with Occluder Fusion," SIGGRAPH 2000, Computer Graphics Proceedings, pp. 229-238 (2000).
Schissler, et al., "Gsound: Interactive sound propagation for games," AES 41st International Conference: Audio for Games, (2011).
Schroder et al., "Real-Time Hybrid Simulation Method Including Edge Diffraction," Proc. of the EAA Symposium on Auralization, pp. 1-6 (Jun. 15-17, 2009).
Schröder et al., "Real-Time Processing of Image Sources Using Binary Space Partitioning," Journal of the Audio Engineering Society, vol. 54, No. 7/8, pp. 604-619 (Jul./Aug. 2006).
Schröder, Dirk, "Physically Based Real-Time Auralization of Interactive Virtual Environments", vol. 11, Logos Verlag Berlin GmbH (2011).
Schroeder, M.R., "Natural sounding artificial reverberation," Journal of the Audio Engineering Society, vol. 10, Issue 3, pp. 19-223, (1962).
Shirley et al., "State of the Art in Interactive Ray Tracing," SIGGRAPH Course Notes (2006).
Shoemake, "Pluecker Coordinate Tutorial," Ray Tracing News 11 (1998).
Siltanen et al., "Frequency Domain Acoustic Radiance Transfer for Real-Time Auralization," Acta Acustica United with Acustica, vol. 95, pp. 106-117 (2009).
Siltanen, et al., "The Room Acoustic Rendering Equation," The Journal of the Acoustical Society of America, vol. 122, No. 3, pp. 1624-1635 (2007).
Southern, et al., "Spatial room impulse responses with a hybrid modeling method," Audio Engineering Society Convention 130 (2011).
Svensson et al., "Computational Modelling and Simulation of Acoustic Spaces," AES 22nd International Conference on Virtual, Synthetic and Entertainment Audio, pp. 1-20 (2002).
Svensson et al., "Edge-Diffraction Impulse Responses Near Specular-Zone and Shadow-Zone Boundaries," Acta Acustica United with Acustica, vol. 92, pp. 501-512 (2006).
Svensson, "Edge Diffraction Toolbox," pp. 1-2 (1999).
Taflove et al, "Computational Electrodynamics: The Finite-Difference Time-Domain Method, Third Edition," 3rd ed. Artech House Publishers, London, UK and Boston, USA, ch. 1,4 (Jun. 2005).
Taylor et al., "Fast Edge-Diffraction for Sound Propagation in Complex Virtual Envirnoments," EAA Auralization Symposium, pp. 1-6 (Jun. 2009).
Taylor et al., "iSound: Interactive GPU-based Sound Auralization in Dynamic Scenes," Techincal Report TR 10-006, University of North Carolina at Chapel Hill, pp. 1-10 (2010).
Taylor, et al., "Guided multiview ray tracing for fast auralization," IEEE Transactions on Visualization and Computer Graphics, vol. 18, Issue 11 (November), pp. 1797-1810, (2012).
Teller et al., "Computing the Antipenumbra of an Area Light Source," SIGGRAPH '92: Proceedings of the 19th Annual Conference on Computer Graphics and Interactive Techniques, pp. 139-148 (1992)
Teller et al., "Visibility Preprocessing for Interactive Walkthroughs," SIGGRAPH Comput. Graph., pp. 61-70 (1991).
Teller, "Visibility Computations in Densely occluded Polyheral Environments," PhD thesis, CS Division, UC Berkeley (1992).

(56) References Cited

OTHER PUBLICATIONS

Theoharis et al., "The Magic of the Z-Buffer: A Survey," Proc. of 9th International Conference on Computer Graphics, Visualization and Computer Vision, WSCG (2001).
Torres et al., "Computation of edge diffraction for more accurate room acoustics auralization," The Journal of the Acoustical Society of America, pp. 600-610 (2001).
Tsingos et al., "A General Model for the Simulation of Room Acoustics Based on Hierarchical Radiosity," ACM SIGGRAPH 97, pp. 1-2 (1997).
Tsingos, et al., "Instant sound scattering," Proceedings of the Eurographics Symposium on Rendering, pp. 111-120, (2007).
Tsingos, et al., "Perceptual audio rendering of complex virtual environments," Tech. Rep. RR-4734, INRIA, REVES/INRIA Sophia-Antipolis, Feb. 2003.
Tsingos, et al., "Pre-computing geometry-based reverberation effects for games," 35th AES Conference on Audio for Games, pp. 1-10, (2009).
Tsingos, Nicholas, "A Versatile Software Architecture for Virtual Audio Simulations," International Conference on Auditory Display (ICAD) (2001).
Valimaki et al., "Fifty Years of Artificial Reverberation," IEEE Transactions on Audio, Speech, and Language Processing, vol. 20, Issue 5, pp. 1421-1448, (2012).
Wald et al., "State of the Art in Ray Tracing Dynamic Scenes," Eurographics State of the Art Reports, pp. 1-28 (2007).
Wand, M, et al., "Multi-resolution sound rendering," SPBG'04 Symposium on Point-Based Graphics 2004, pp. 3-11, (2004).
Wang et al., "A Hybrid Technique Based on Combining Ray Tracing and FDTD Methods for Site-Specific Modeling of Indoor Radio Wave Propagation," IEEE Transactions on Antennas and Propagation, vol. 48, No. 5, pp. 743-754 (May 2000).
Wang, et al., "Interactions of Model Detail Level and Scattering Coefficients in Room Acoustic Computer Simulation," International Symposium on Room Acoustics: Design and Science (2004).
Waterman, "T-matrix methods in acoustic scattering," The Journal of the Acoustical Society of America, vol. 125, No. 1, pp. 42-51 (Jan. 2009).
Wefers et al., "Efficient Time-Varying FIR Filtering using Crossfading Implemented in the DFT Domain," Forum Acousticum, Krakow, Poland, European Acoustics Association (2014).
Wonka et al., "Guided Visibility Sampling," SIGGRAPH '06: ACM SIGGRAPH 2006 Papers, pp. 494-502 (2006).
Wonka et al., "Visibility Preprocessing with Occluder Fusion for Urban Walkthroughs," pp. 1-12 (2000).
Yee, "Numerical Solution of Initial Boundary Value Problems Involving Maxwell's Equations in Isotropic Media," IEEE Transactions on Antennas and Propagation, vol. 14, No. 3, pp. 302-307 (May 1966).
Yeh, et al., "Wave-ray coupling for interactive sound propagation in large complex scenes," ACM Transactions on Graphics, vol. 32, Issue 6, pp. 165:1-165:11, (2013).
Yin et al., "Generating 3D Builing Models from Architectural Drawings: A Survey," IEEE Computer Society, pp. 20-30 (Jan./Feb. 2009).
Yoon et al., Real-Time Massive Model Rendering, Morgan and Claypool Publishers (2008).
Zienkiewicz et al., "The Finite Element Method for Fluid Dynamics," 6 ed. Butterworth-Heinemann (Jan. 2006).
Final Office Action for U.S. Appl. No. 14/329,251 (dated Aug. 28, 2017).
Non-Final Office Action for U.S. Appl. No. 14/754,155 (dated Jun. 6, 2017).
Advisory Action and AFCP 2.0 Decision for U.S. Appl. No. 14/329,251 (dated Nov. 16, 2017).
Notice of Allowance and Fee(s) Due for U.S. Appl. No. 14/812,785 (dated Oct. 30, 2017).
Applicant-Initiated Interview Summary for U.S. Appl. No. 14/754,155 (dated Apr. 19, 2018).
Non-Final Office Action for U.S. Appl. No. 14/329,251 (dated Jan. 26, 2018).
Final Office Action for U.S. Appl. No. 14/754,155 (dated Jan. 22, 2018).
Advisory Action, Examiner-Initiated Interview Summary and AFCP 2.0 Decision for U.S. Appl. No. 14/754,155 (dated May 22, 2018).
Applicant-Initiated Interview Summary for U.S. Appl. No. 14/329,251 (dated May 15, 2018).
Advisory Action for U.S. Appl. No. 14/329,251, (dated Sep. 25, 2018).
Applicant-Initiated Interview Summary for U.S. Appl. No. 14/329,251 (dated Aug. 24, 2018).
Final Office Action for U.S. Appl. No. 14/329,251 (dated Jun. 6, 2018).

* cited by examiner

400

| Visual Category | Acoustic Material | Absorption | | | | | |
|---|---|---|---|---|---|---|---|
| | | 125Hz | 250Hz | 500Hz | 1,000Hz | 2,000Hz | 4,000Hz |
| Brick | Brick, unglazed | 0.02 | 0.02 | 0.03 | 0.04 | 0.05 | 0.07 |
| Carpet | Carpet, heavy, on concrete | 0.02 | 0.06 | 0.14 | 0.37 | 0.60 | 0.65 |
| Ceramic | N/A | 0.10 | 0.10 | 0.10 | 0.10 | 0.10 | 0.10 |
| Fabric | Fabric Drapery, lightweight | 0.03 | 0.04 | 0.11 | 0.17 | 0.24 | 0.35 |
| Glass | Glass, ordinary window | 0.35 | 0.25 | 0.18 | 0.12 | 0.07 | 0.04 |
| Leather | Leather seating | 0.44 | 0.54 | 0.60 | 0.62 | 0.58 | 0.50 |
| Metal | Steel | 0.05 | 0.10 | 0.10 | 0.10 | 0.07 | 0.02 |
| Painted | Gypsum board, 1/2", with 4" airspace | 0.29 | 0.10 | 0.05 | 0.04 | 0.07 | 0.09 |
| Plastic | N/A | 0.10 | 0.10 | 0.10 | 0.10 | 0.10 | 0.10 |
| Stone | Concrete, rough | 0.01 | 0.02 | 0.04 | 0.06 | 0.08 | 0.10 |
| Stone, polished | Concrete, smooth | 0.01 | 0.01 | 0.02 | 0.02 | 0.02 | 0.02 |
| Tile | Tile, marble or glazed | 0.01 | 0.01 | 0.01 | 0.01 | 0.02 | 0.02 |
| Wallpaper | Gypsum board, 1/2", with 4" airspace | 0.29 | 0.10 | 0.05 | 0.04 | 0.07 | 0.09 |
| Wood | Wood, 1" paneling, with airspace | 0.19 | 0.14 | 0.09 | 0.06 | 0.06 | 0.05 |

FIG. 4

| Scene | Scene Complexity | | | Classification | | | Optimization |
|---|---|---|---|---|---|---|---|
| | Dimensions (m) | # Triangles | $RT_{60}$ (s) | # Images | Time (hr) | % Correct | Time (s) |
| Room 216 | 5x3.8x2.6 | 228,017 | 0.29 | 486 | 9.3 | 43.6 | 142.2 |
| Room 229 | 5.3x3.6x2.6 | 139,545 | 0.44 | 481 | 9.2 | 52.5 | 154.1 |
| Room 251 | 3.9x3.3x2.6 | 168,098 | 0.37 | 340 | 6.5 | 43.8 | 134.9 |
| Room 348 | 4.3x3.1x2.6 | 131,194 | 0.37 | 481 | 9.2 | 51.4 | 150.5 |

METHODS, SYSTEMS, AND COMPUTER READABLE MEDIA FOR ACOUSTIC CLASSIFICATION AND OPTIMIZATION FOR MULTI-MODAL RENDERING OF REAL-WORLD SCENES

TECHNICAL FIELD

The subject matter described herein relates to virtual sound modeling. More specifically, the subject matter relates to methods, systems, and computer readable media for acoustic classification and optimization for multi-modal rendering of real-world scenes.

BACKGROUND

Sound propagation techniques determine how sound waves travel in a space and interact with the environment. In many applications, it is important to be able to simulate sound propagation in large scenes, such as games and training in both indoor and outdoor scenes, noise prediction in urban areas, and architectural acoustics design for buildings and interior spaces such as concert halls. Realistic acoustic effects can also improve the realism of a virtual environment. Acoustic phenomena such as interference, diffraction, and scattering for general scenes can only be captured by accurately solving the acoustic wave equation. The large spatial and frequency domain and accuracy requirement pose a significant challenge for acoustic techniques to be used in these diverse domains with different requirements.

Various techniques may be used in predicting or modeling sound propagation. However, current techniques are unable to efficiently perform acoustic classification and optimization for multi-modal rendering of real-world scenes.

SUMMARY

Methods, systems, and computer readable media for acoustic classification and optimization for multi-modal rendering of real-world scenes are disclosed. Methods, systems, and computer readable media for acoustic classification and optimization for multi-modal rendering of real-world scenes are disclosed. According to one method for determining acoustic material properties associated with a real-world scene, the method comprises obtaining an acoustic response in a real-world scene. The method also includes generating a three-dimensional (3D) virtual model of the real-world scene. The method further includes determining acoustic material properties of surfaces in the 3D virtual model using a visual material classification algorithm to identify materials in the real-world scene that make up the surfaces and known acoustic material properties of the materials. The method also includes using the acoustic response in the real-world scene to adjust the acoustic material properties.

A system for determining acoustic material properties associated with a real-world scene is also disclosed. The system includes at least one processor and a sound propagation model (SPM) module executable by the at least one processor. The SPM module is configured to obtain an acoustic response in a real-world scene, to generate a three-dimensional (3D) virtual model of the real-world scene, to determine acoustic material properties of surfaces in the 3D virtual model using a visual material classification algorithm to identify materials in the real-world scene that make up the surfaces and known acoustic material properties of the materials, and to use the acoustic response in the real-world scene to adjust the acoustic material properties.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

Various embodiments of the subject matter described herein will now be explained with reference to the accompanying drawing, wherein like reference numerals represent like parts, of which:

FIG. 4 is a diagram illustrating example material categories and absorption coefficient data;

FIG. 8 is a diagram illustrating example scene details of four benchmark scenes;

DETAILED DESCRIPTION

Figure 1:
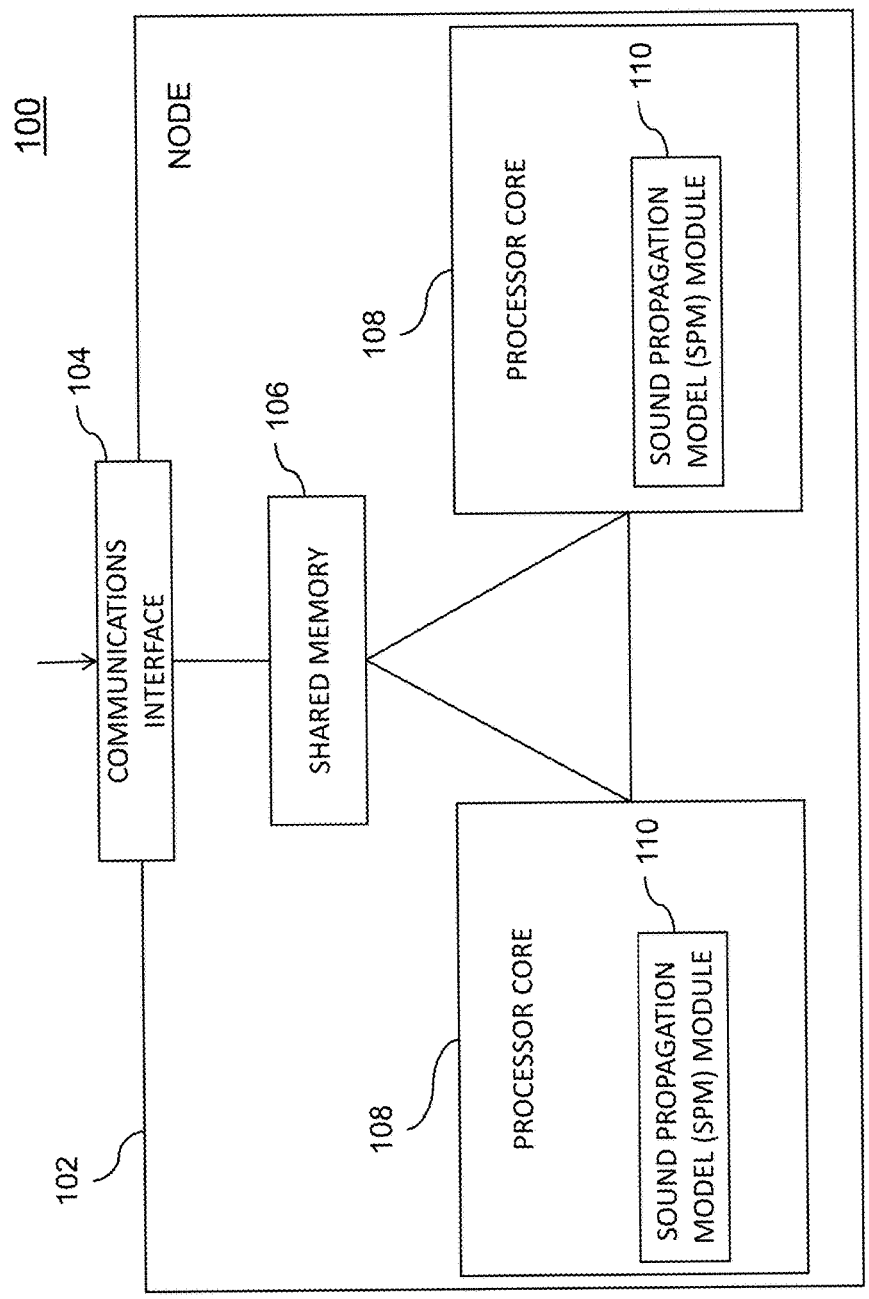
FIG. 1 is a diagram illustrating an example node for acoustic classification and optimization for multi-modal rendering of real-world scenes.

The subject matter described herein relates to methods, systems, and computer readable media for acoustic classification and optimization for multi-modal rendering of real-world scenes.

1 Introduction

Recent advances in computer vision have made it possible to generate accurate 3D models of indoor and outdoor scenes from a sequence of images and videos. The resulting models are frequently used for visual rendering, physicsbased simulation, or robot navigation. In many applications including computer-aided design, teleconferencing, and augmented reality, it is also important to augment such scenes with synthetic or realistic sound effects. It has been shown that good sound rendering leads to an improved sense of presence in virtual and augmented environments [1], [2].

The simplest methods for generating acoustic effects in augmented reality and/or virtual reality (AR/VR) are based on artificial reverberation filters which use simple parametric decay models. However, the specification of these parameters is time consuming and these techniques cannot simulate many effects, such as diffraction or direction-dependent reverberation. Instead, the most accurate algorithms are based on sound propagation and dynamically compute an impulse response (IR), or transfer function, based on the current position of the source(s) and the listener within the environment. The sound effects heard by the listener are computed by convolving the impulse response with unprocessed or dry source audio.

In order to simulate sound propagation within a real-world scene, a 3D surface representation is needed, usually in the form of a triangle mesh. Another important requirement for sound propagation is the need for accurate acoustic material properties for the 3D scene representation. These properties include absorption and scattering coefficients. They specify how sound waves interact with surfaces in the scene and can strongly influence the overall acoustic effects in the scene, including the reverberation time. The material properties depend on a variety of factors including the angle of sound incidence, frequency, acoustic impedance, thickness, surface roughness, and whether or not there is a resonant cavity behind the surface [3], [4], [5].

The geometric models used in current sound propagation systems are either synthetically generated (e.g., using a CAD system) or reconstructed from sensor data using computer vision techniques. However, it is difficult to determine the appropriate material properties for the 3D mesh. Current sound propagation techniques have relied on tables of measured acoustic material data that are assigned to the scene triangles or objects by a user [6].

However, assigning these properties is a time-consuming manual process that requires an in-depth user knowledge of acoustic materials. Furthermore, the resulting simulations may not match known acoustic characteristics of real-world scenes due to inconsistencies between the measured data and actual scene materials.

Recent improvements in data acquisition and computer vision techniques have resulted in a large body of work on reflectance acquisition [7], which is targeted towards realistic visual rendering. However, these methods may not be directly useful for sound propagation, as they do not account for acoustic phenomena (e.g., frequency-dependent wave effects).

2 Related Work

In this section a brief overview of related work in sound propagation, acoustic material properties, 3D reconstruction, and visual material segmentation is discussed.

2.1 Sound and Multi-Modal Rendering

Realistic sound effects can improve the sense of immersion in virtual or augment reality. Further, a greater correlation between audio and visual rendering leads to an improved sense of spaciousness in the environment [2], [8]. In order to generate realistic sound effects, we need the 3D model of the environment along with the acoustic characteristics of the materials.

Algorithms that simulate the propagation of sound in a virtual environment can be broadly divided into two major classes: wave and geometric. Wave-based techniques numerically solve the wave equation and are the most accurate sound propagation approaches. These include offline approaches like the finite element method [9], adaptive rectangular decomposition [10], and the boundary-element method [11]. However, the computational complexity of these techniques increases dramatically with the size of the acoustic space and the simulation frequency, making them impractical for interactive applications. Other techniques like the equivalent source method [12] are designed for real-time auralization and perform considerable precomputation, but are in practice limited to static scenes and low to middle frequencies (e.g., 1-2 KHz). Wave-based precomputation approaches have also been extended to handle dynamic sources [13], but the memory and precomputation cost of these is substantial.

On the other hand, geometric sound propagation techniques are better suited for interactive applications and can generate plausible effects. These approaches simplify the computation of acoustic effects by assuming that the wavelength of sound is much smaller than the size of primitives in the scene. As a result, they are less accurate at low frequencies, where wave effects become more prominent. Image source methods [14], beam tracing [15] and frustum tracing [16] have been proposed for computing specular reflections, while Monte Carlo path tracing is commonly used for computing diffuse reflections [16], [17], [18], [19]. Geometric techniques tend to approximate diffraction as a special case of sound transport. The uniform theory of diffraction (UTD) [20] is frequently used for interactive applications, while the more accurate Biot-Tolstoy-Medwin (BTM) method is better suited for offline simulation [21]. All these methods assume that a 3D geometric model of a scene with acoustic material properties is given and the resulting sounds are generated using real-world recordings or synthesized sounds.

2.2 Acoustic Materials

The properties of an acoustic material determine how incident sound interacts with the material: how it is reflected, scattered, and transmitted through the material. While complex bidirectional reflection distribution functions (acoustic BRDFs) have been used to describe the reflectance of sound with respect to the incoming and outgoing directions [22], a lack of measured data for most material types limits their usefulness. More commonly, the reflection characteristics of an acoustic material are specified using a frequency-dependent absorption coefficient $\alpha \in [0, 1]$ that determines the fraction of incident sound pressure absorbed with each reflection [4]. $\alpha$ is generally a function of the incident angle, $\theta_i$, though it is common to instead average $\alpha(\theta_i)$ over $\theta_i$ to compute the random incidence absorption coefficient, $\alpha_{rand}$. This value is commonly measured according to ISO 354 [23]. A sheet of the material to be tested is placed in a reverberation chamber with a known reverberation time. The change in reverberation time with the material present is used with the Sabine equation to estimate $\alpha_{rand}$. A table of measured sound absorption coefficients for 66 common architectural material types can be found in [3]. The absorptive properties of a surface can also be described by the sound energy reflection coefficient, $R = \sqrt{1-\alpha}$. An example optimization approach described herein is formulated in terms of R, rather than $\alpha$.

Other models have been proposed for calculating sound scattering. The simplest use a single frequency-dependent scattering coefficient $s \in [0, 1]$ that indicates the fraction of incident sound that is scattered [24]. Usually a Lambertian distribution is assumed for the scattered sound. The remainder of the sound energy (1−s) is specularly reflected.

Many algorithms have been proposed to optimize the acoustic parameters for computer-aided design [25] or estimate the acoustic properties of real world scenes for inverse sound rendering [26], [27]. Recently, a genetic algorithm has been proposed to estimate the material properties of an existing room so that it matches measurements [28]. However, this process is time-consuming and requires many iterations. An example approach described herein shares the same theme in terms of using acoustic measurements and is most similar in formulation to [26], but an example approach described herein is also able to handle diffuse reflections, diffraction, real-world measured IRs, and is robust to measurement noise.

2.3 3D Reconstruction 3D model reconstruction remains an active area of research in computer vision [29]. Many reconstruction approaches use two or more camera images of the same scene to estimate its structure. Passive methods use RGB images of a scene, while active reconstruction methods are based on projecting a structured light pattern into the scene [30], [31]. By analyzing the deformations of the light source with respect to the projected pattern, pixel correspondences can be found and used to compute high-quality depth maps. The relative transformation of the cameras is either known or estimated from image features. The Iterative Closest Point algorithm [32] aligns the depth image for a given frame with the structure of previously captured data, while Structure from Motion approaches match feature points (e.g., SIFT) in the images to estimate the camera poses. The depth information in the images is then fused to generate a 3D mesh in a global coordinate system. High-level plane primitive models can be used to improve the quality of the reconstruction [33]. Some of the criteria for 3D model reconstruction for sound rendering are different than for visual rendering. For example, it is important to ensure layouts are good [34] and that resulting models are watertight with no holes [35], [36]. Furthermore, we may not need to reconstruct many small features of real-world scenes. Previous work has shown that approximate mesh data can be sufficient to simulate the main acoustic characteristics of a virtual space [37], [38].

2.4 Visual Material Segmentation

Given an image of a scene, material segmentation approaches use visual characteristics to determine a material type for each pixel in the image. [39] combines both low-level (e.g., color) and mid-level (e.g., SIFT) image features trained in a Bayesian framework and achieve moderate material recognition accuracy. By using object and material recognition together, it has been shown that recognition results can be improved [40]. The most recent techniques are based on convolutional neural networks (CNNs) [41]. The Materials in Context Database (MINC) is a notable example where CNNs were trained for classification of material patches [42]. Context within the patches is used to improve the classification results, and these CNN classifiers were combined in a conditional random field (CRF) framework to perform segmentation and material recognition on every pixel in an image. An example approach described herein builds on this work and extends these ideas to classification of acoustic materials in 3D reconstructions of real-world scenes.

In accordance with some aspects of the present subject matter described herein, mechanisms, processes, algorithms, or systems may be provided for generating virtual acoustic effects in captured 3D models of real-world scenes for multimodal augmented reality. Further, mechanisms, processes, algorithms, or systems may be provided for automatically computing acoustic material properties associated with materials in the real-world scene. For example, one aspect described herein involves applying CNNs to estimate acoustic material properties, including frequency-dependent absorption coefficients, that may be used for interactive sound propagation. Another aspect described herein involves an iterative optimization algorithm for adjusting the materials or acoustic properties thereof until a virtual acoustic simulation converges to measured acoustic impulse responses (IRs), e.g., recorded IRs at the real-world scene. Using various aspects described herein, automatic computation of acoustic material properties from 3D reconstructed models for augmented reality applications may be performed efficiently and effectively.

Reference will now be made in detail to various embodiments of the subject matter described herein, examples of which may be illustrated in the accompanying drawings. Wherever possible, the same reference numbers will be used throughout the drawings to refer to the same or like parts.

FIG. 1 is a diagram illustrating an example node 102 (e.g., a single or multiple processing core computing device) for supporting source and/or listener directivity in a wave-based sound propagation model. Node 102 may be any suitable entity, such as one or more computing devices or platforms, for performing one more aspects of the present subject matter described herein. In some embodiments, components, modules, and/or portions of node 102 may be implemented or distributed across multiple devices or computing platforms.

Node 102 may include a communications interface 104, a shared memory 106, and one or more processor cores 108. Communications interface 104 may be any suitable entity (e.g., a communications interface and/or a data acquisition and generation (DAG) card) for receiving and/or sending messages. For example, communications interface 104 may be interface between various nodes 102 in a computing cluster. In another example, communications interface 104 may be associated with a user interface or other entity and may receive configuration setting and/or source data, such as audio information, for processing during a sound propagation model application.

In some embodiments, communications interface 104 or another component may be configured to identify or select a processor core 108 for processing or analysis and/or information for storage. For example, communications interface 104 may receive information from another node in a cluster and may determine that a particular processor core 108 should process the received information. In another example, communications interface 104 may store information in shared memory 106 and the stored information may be retrieved later by an available processor core 108.

Shared memory 106 may be any suitable entity (e.g., random access memory or flash memory) for storing sound propagation information, acoustic classification information, various algorithms, measured impulse responses for various real-world scenes, simulated impulse responses for 3D models of real-world scenes, and/or other information. Various components, such as communications interface 104 and software executing on processor cores 108, may access (e.g., read from and/or write to) shared memory 106.

Each of processor cores 108 represents any suitable entity (e.g., a physical processor, a field-programmable gateway array (FPGA), and/or an application-specific integrated circuit (ASIC)) for performing one or more functions associated with sound propagation modeling, acoustic classification, and/or related acoustic optimization. Processor cores 108 may be associated with a sound propagation model (SPM) module 110. For example, SPM module 110 or software therein may be executable by one or more processor cores 108.

SPM module 110 may be configured to use one or more techniques (e.g., geometric acoustic techniques and/or numerical acoustic techniques) for modeling sound propagation in one or more environments. Existing techniques for modeling sound propagation can be broadly classified into geometric and wave-based techniques. Example sound propagation techniques usable by SPM module 110 may include a finite element method, a boundary element method, an equivalent source method, various spectral methods, or another technique described herein.

In some embodiments, SPM module 110 may be configured for performing acoustic classification and/or optimization related to real-world scenes. In some embodiments, acoustic classification and/or optimization may involve determining acoustic material properties associated with a real-world scene. For example, SPM module 110 or related algorithms may obtain an acoustic response in a real-world scene, generate a 3D virtual model of the real-world scene, determine acoustic material properties of surfaces in the 3D virtual model using a visual material classification algorithm to identify materials in the real-world scene that make up the surfaces and known acoustic material properties of the materials; and use the acoustic response in the real-world scene to adjust the acoustic material properties.

In some embodiments, SPM module 110 may be configured to work in parallel with a plurality of processor cores 108 and/or nodes 102. For example, a plurality of processor cores 108 may each be associated with a SPM module 110. In this example, each processor core 108 may perform processing associated with modeling sound propagation for a particular environment. In another example, some nodes 102 and/or processing cores 108 may be utilized for performing 3D reconstructions of real-world scenes and other nodes 102 and/or processing cores 108 may be utilized to determine acoustic material properties by using one or more optimization algorithms and the 3D reconstructions.

It will be appreciated that FIG. 1 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 2:
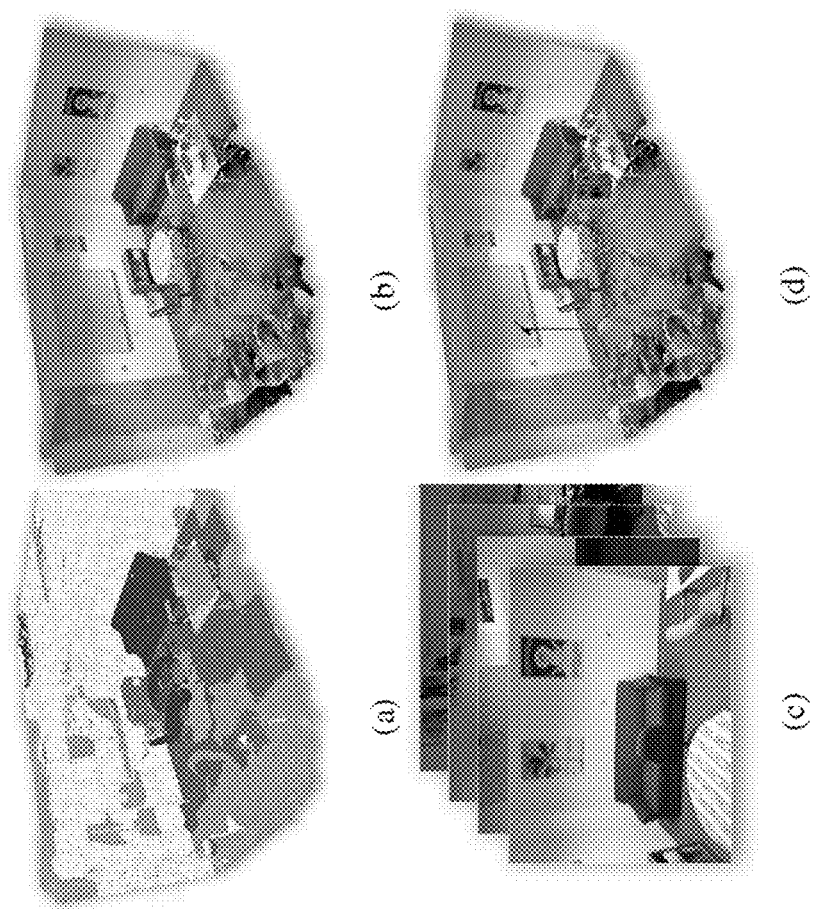
FIG. 2 is a diagram illustrating aspects associated with an example approach for determining acoustic material properties associated with a real-world scene.

FIG. 2 is a diagram illustrating aspects associated with an example approach 200 for determining acoustic material properties associated with a real-world scene. Referring to FIG. 2, approach 200 may involve generating 3D reconstructions of real-world scenes (a) and (b), using deep learning material classifiers applied to RGB camera images, (c); and optimizing material absorption coefficients to generate sound propagation effects that match acoustic measurements of the real-world scene using a simple microphone and speaker setup, (d). In some embodiments, synthetic sound effects may be combined with visual renderings of captured models for multimodal augmented reality.

In some embodiments, approach 200 or a related approach described herein may be used for automatically determining the acoustic material properties of 3D-reconstructed real-world scenes for multimodal augmented reality applications. For example, an example using aspects described herein may build on recent advances in computer vision in terms of 3D scene reconstruction and may augment them with acoustic measurements of the reverberation time.

In some embodiments, approach 200 or a related approach described herein may utilize a CNN for classifying materials in a real-world scene. For example, a CNN may be used to analyze images of a real-world scene for various materials in the real-world scene and may use the result of the analyses to classify the materials associated with each triangle of the 3D reconstructed model (Section 3.1). In this example, the materials may be used to initialize an optimization algorithm that iteratively adjusts the frequency-dependent absorption coefficients until the resulting acoustic simulation (e.g., computed using path tracing) is similar to measured acoustic data (e.g., recorded impulse responses) from the real-world scene (Section 3.2). Continuing with the example, the resulting 3D model and the acoustic material characteristics are used to simulate realistic sound propagation effects for augmented reality.

3 Acoustic Materials for Reconstructed Scenes

Figure 3:
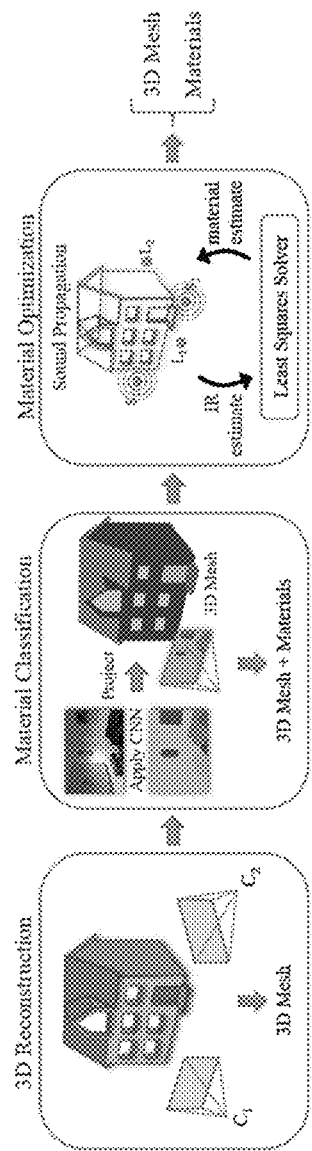
FIG. 3 is a diagram illustrating aspects associated with an example acoustic classification and optimization approach.

In this section, sound propagation aspects for 3D reconstructions of real-world scenes are discussed. FIG. 3 is a diagram illustrating aspects associated with an example acoustic classification and optimization approach 300. Referring to FIG. 3, approach 300 includes generating a 3D reconstruction of a real-world scene from multiple camera viewpoints, performing a visual material segmentation on camera images of the real-world scene, thereby producing a material classification for each triangle in the scene, and performing material optimization to determine appropriate acoustic material properties for the materials in the real-world scene. In some embodiments, results from approach 300 may include a 3D mesh with acoustic materials that can be used to perform plausible acoustic simulation for augmented reality.

In some embodiments, approach 300 or a similar approach may utilize a dense 3D triangle mesh that has been reconstructed using traditional multi-camera computer vision approaches. We assume that the mesh is mostly free of holes and other reconstruction errors. Approach 300 or another approach may also involve applying a CNN-based material classifier to each of the RGB camera images from the reconstruction to determine the probability that materials from a known database are present. The materials in each image may be projected onto the 3D mesh and the most likely material may be chosen for each material patch, where the patches may be generated using a 3D superpixel segmentation algorithm. If acoustic measurements of the real-world scene (e.g., recorded audio samples) are available, this material information may be used to initialize an optimization algorithm that iteratively refines the materials and/or the acoustic properties thereof so that virtual sound propagation output matches these acoustic measurements. In some embodiments, approach 300 or a similar approach may yield a 3D mesh and a set of materials that can be used for sound propagation and can generate virtual sounds that match those in the real environment.

In some embodiments, a material optimization algorithm usable in approach 300 or a similar approach may include a sound propagation simulation phase for performing sound propagation simulation at locations in 3D model that corresponds to measurement locations for acoustic measurements of the real-world scene and a material estimation phase for changing acoustic material properties used in the sound propagation simulation, whereas the optimization algorithm may continuing alternating between these phases until the simulation matches (or approximately matches) acoustic measurements of the real-world scene or other termination conditions are met.

In some embodiments, capturing acoustic characteristics or measurements of real-world scenes is designed to be simple and practical. In particular, assumptions about captured acoustic data may be used to ensure that the optimization algorithm can compute the absorption coefficients quickly. Furthermore, simple acoustic sensors (e.g., a simple microphone and speaker) may be used to capture the impulse responses of real-world scenes.

3.1 Visual Material Classification for Acoustics

In some embodiments, approach 300 or a similar approach may utilize a visual material classification algorithm that uses camera images of a real-world scene to determine materials and/or acoustic properties thereof. For example, an example visual material classification algorithm or technique may use the visual appearance of a real-world scene to estimate the acoustic material properties of the primitives. In this example, a strong correspondence between the visual appearance of a surface and its acoustic material may be assumed. For example, if a surface appears to be like brick, it is likely to have acoustic properties similar to the measured acoustic characteristics of a brick (e.g., to be highly reflective). The basis of an example visual material classification algorithm described herein is the Materials in Context Database (MINC) and its classifier models that have been trained for 23 common material categories [42]. From these 23 categories, a subset of 14 that are likely to be encountered in real-world scenes may be selected and material categories that are less relevant for acoustic simulation (e.g., hair, skin, food) may be ignored or discarded. In some embodiments, each of the categories with measured data may be associated with similar acoustic material types from [3]. For example, the MINC "brick" material category may be matched with the measured absorption coefficients for the "unpainted brick" acoustic material. When there is not a one-to-one mapping between the visual material categories and the acoustic material data, the most similar acoustic material in the database may be. This process may be performed once per material category. The resulting table of material categories and their associated acoustic materials are summarized in FIG. 4.

FIG. 4 is a diagram illustrating example material categories and absorption coefficient data 400. Referring to FIG. 4, material categories and absorption coefficient data 400 is depicted in a table format and may be used for various classification approaches described herein. As depicted in FIG. 4, for each of the visual material categories, a similar acoustic material and its absorption coefficients were chosen from [3]. For the "Ceramic" and "Plastic" categories, there was no suitable measured data available so a default absorption coefficient of 0.1 was assigned for all frequencies.

The MINC CNNs were trained on material patches classified by human workers on Amazon Mechanical Turk. [42] has shown that context, i.e., the image content surrounding a point of interest, is important in accurately classifying the materials in an image. For this reason, we choose to use images of real-world scenes as the input to the classification pipeline since they contain the necessary context information. For 3D scene reconstruction, a structured-light RGBD camera is used to capture the images of the scene.

These images may be used as the input to an example visual material classification algorithm described herein. Using the approach of [33], a 3D triangle mesh may be generated for the scene with the color specified per-vertex. As part of the reconstruction, the camera projection matrix for each image may be available. These matrices may be used to project the computed materials onto the mesh.

In some embodiments, an example visual material classification algorithm described herein may be applied to each of the RGB camera images independently. A variant of the sliding-window approach detailed in [42] may be used to apply the MINC trained GoogLeNet [43] to a grid of locations in each input image. The input to the network is a square image patch centered at the test location of size $p=d \times 256/1100$ where d is the smaller of the image dimensions. The patches are extracted from the input image and scaled to 224×224 resolution. The mean of the patch is subtracted before it is passed through the CNN. At each test location, the CNN classifier predicts a probability for each material category. This grid of test locations is used to generate probability maps for all of the material categories. The probability maps are low-resolution images indicating the probability that a given material type is present at a position in the original image. The results are bilinearly filtered to the original image resolution and padded with zeros to maintain alignment before they are used to generate a final probability map for each camera image and material category.

3.1.1 Patch Segmentation

In some embodiments, after performing a visual material classification using camera images, approach 300 or a similar approach may determine the segmentation of material patches that should be used for the reconstructed 3D triangle mesh. These patches may be localized groups of triangles that are assumed to be the same material. A 3D version of the SLIC superpixel segmentation algorithm [44] and the vertex colors computed during reconstruction from the RGB images may be used in determining the segmentation. For example, when clustering triangles rather than voxels, triangles may be clustered according to the interpolated color of each triangle's centroid. In some embodiments, a first step in the SLIC algorithm is to convert the RGB color for each triangle centroid to the LAB color space. Then, the initial superpixel cluster centers in 3D space may be determined by sampling the bounding box of the mesh at regular interval s on a cubic grid. The sampling interval s may be determined using the relation $s=(V/k)1/3$, where V is the volume of the mesh's bounding box and k is the desired number of cluster centers. The initial color values for the cluster centers may be chosen to be the colors of the nearest triangle centroids. Thus, each cluster and triangle is described by an (X, Y, Z, L, A, B) tuple.

In some embodiments, after identifying triangle clusters, a SLIC algorithm or similar algorithm may iteratively refine the clusters until the maximum error for all clusters is lower than a threshold or until the algorithm converges. For example, each cluster may consider all triangles within a 2 s×2 s×2 s region around the center point in 3D space. The distance in XYZLAB space between the triangle centroid and cluster center may be computed according to the standard SLIC distance metric, and the cluster label for each triangle may be chosen to be the cluster with the smallest distance. Then, the XYZLAB cluster centers may be recomputed as the average of all triangle centroids that belong to a cluster. The residual error between the old and new cluster centers may be determined using the L2 norm in XYZLAB space. If the error is less than a threshold or if the error converges, the algorithm may terminate. In some embodiments, the result a SLIC algorithm or similar algorithm may include a collection of material patches that tend to closely match the visual features and boundaries in the reconstructed mesh. These patches may be used by an example material optimization algorithm described herein (Section 3.2).

3.1.2 Material Projection

In some embodiments, approach 300 or a similar approach may generate a 3D triangle mesh using 2D classification results associated with a visual material classification algorithm. For example, 2D classification results for all images may be combined and applied to the reconstructed 3D triangle mesh. For each patch in the mesh, an accumulator $p_i$ may be created, initially set to zero, that stores the probability that the patch has the ith material type. Next, the material probabilities present in each image may be projected into the scene with the camera projection matrix. For example, this operation may be performed by tracing a ray for each image pixel. The patch intersected by the ray may be updated by sampling from the probability map for the ith material type, and then the sampled probability may be added to $p_i$. After this step has been carried out for every input image, the determined material for each patch may be the material with the largest $p_i$. By combining the results from many input images that are likely to have significant overlap, more robust material classification can be achieved than by using the results from a single image. Additionally, pooling the $p_i$ for each material patch rather than for each triangle generates more robust material classifications that follow patch boundaries and are more likely to match the visual features of the mesh.

3.1.3 Mesh Simplification

In some embodiments, a final step in preparing a reconstructed mesh for acoustic simulation may involve simplifying a dense triangle mesh. For example, dense 3D reconstructions frequently have triangles that are smaller than the smallest audible wavelength of 1.7 cm, given by the speed of sound in the air and human hearing range. However, geometric sound propagation algorithms are generally more accurate when surface primitives are larger than audible sound wavelengths. Therefore, an acoustic mesh simplification technique [19] may be applied to the dense 3D mesh and its material properties to increase the size of surface primitives and to reduce the number of edges for diffraction computation. The simplification algorithm may involve a combination of voxel remeshing, vertex welding, and the edge collapse algorithm to reduce the model complexity. Boundaries between the patches may be respected by the simplification so that no additional error is introduced. In some embodiments, a simplification algorithm may result is a mesh that is appropriate for geometric sound propagation.

3.2 Acoustic Material Optimization

While visual material classification algorithms can achieve good results for visually salient materials (e.g., brick and grass), other material types may be ambiguous (e.g., painted walls) or not included in the training set. Furthermore, the materials for occluded areas in the scene are also unknown. At the same time, these occluded areas contribute to the acoustic effects due to reflections and diffraction. In addition, when applied to acoustic material classification, the techniques developed for visual materials do not consider non-visual properties like density and the presence of hidden resonant cavities in the scene that can also affect the acoustic characteristics. The thickness and rigidity of walls also influence how sound propagates and these properties cannot be determined visually. As a result, a visual material classification algorithm used on the surfaces in a scene may not accurately classify the acoustic materials. Even if accurate material segmentation and classification information is known, the resulting sound simulated using that information may not match the real-world scene because the measured acoustic material data that is assigned to each material does not necessarily generalize to arbitrary scenes. Another issue is that holes in the 3D reconstructed mesh can cause the sound to 'leak' out of the scene, unnaturally decreasing the reverberation time. This problem can be mitigated by automatic hole-filling techniques [45], [46], but they do not always produce a correct result and can introduce other meshing errors.

In some embodiments, in order to overcome these issues, captured acoustic measurements, e.g., impulse responses (IRs), in the real-world scenes may be used. For example, approach 300 or a similar approach may use a second pipeline stage that optimizes the visually-classified material properties, computed using the algorithm in Section 3.1, so that the resulting acoustic simulation more closely matches the IRs of acoustic measurements taken from the real-world scene. In some embodiments, reverberation time, RT60, and Sabine reverberation equation may be used to globally modify the absorption coefficients to match the measured RT60. However, the Sabine model may be only valid for rectangular rooms and does not consider other important quantities like the ratio of direct to late sound energy. The RT60 may also vary little throughout an environment, and so it may not provide much information about the spatial locality of absorption. As a result, an approach based on matching only the RT60 may yield large errors with respect to other perceptually relevant metrics.

In some embodiments, an example optimization algorithm usable in approach 300 or another approach may optimize the sound energy reflection coefficient R for each material patch and simulation frequency band using an iterative least-squares approach in order to minimize the error between energy-time histograms from the simulation and energy-time histograms from measured IRs. In such embodiments, by using measured IRs from a real-world scene during optimization, the example optimization algorithm may be capable of optimizing materials for sound rendering in real-world scenes.

By using measured IRs, an example optimization algorithm described herein improves on several significant limitations of a prior approach in [26]. For example, the approach in [26] makes the assumptions that all reflections are specular, that there is no significant diffraction, that all sound propagation paths are discrete and known to the optimization system, and that there is a one-to-one correspondence between the paths in the optimized and target IRs. These assumptions in [26] can only be satisfied if the optimization target IR is computed using the same simulation that is used during optimization, which is not the case for measured IRs. In addition the approach of [26] only considers the early reflections computed via beam tracing and so it cannot optimize the late reverberation present in real-world scenes that involves high-order diffuse reflections. These limitations prevent the method in [26] from optimizing acoustic materials to match real-world measurements.

3.2.1 Acoustic Measurements

In some embodiments, the target of an example optimization algorithm described herein is a collection of impulse response measurements from the real-world scene. For each IR measurement, there is a corresponding source and listener placed within the virtual reconstructed 3D mesh. The target measured IR for a single source/listener pair may be given by the time-domain signal HT (t), while the IR computed in the virtual scene for the same source/listener pair may be given by the signal HS (t). To use these IRs in an example optimization approach described herein, the first step is to filter them into the frequency bands used for the sound propagation simulation. This yields HT,f(t) and HS,f(t) for frequency band f. Then, the Hilbert Transform is applied to extract the pressure magnitude envelope from the filtered IRs [47]. The square of the IR envelope then yields the energy-time curve for each impulse response, indicating the distribution of sound energy over time. The energy-time curve for the target and simulated impulse responses and frequency band f are given by Tf(t) and Sf(t) respectively. The high-level goal of the optimization algorithm is to minimize the error between Sf(t) and Tf(t). Since the number of time samples in the IRs may be on the order of $10^5$, it is necessary to perform the optimization at a lower sampling rate than the audio rendering sample rate to reduce the size of the optimization problem and increase its robustness. This is done by binning the energy present in the energy-time curves to produce energy-time histograms $S_{f,b}$ and $T_{f,b}$ where b is the bin index. Thus, an example optimization algorithm described herein in practice minimizes the error between $S_{f,b}$ and $T_{f,b}$. The energy for bin b in each IR may be given by: $S_{f,b}=\Sigma_{t_b \in b} S_f(t_b)$ and $T_{f,b}=\Sigma_{t_b \in b} T_f(t_b)$. The bin size L is a parameter that determines the time resolution of the optimization and it impacts the robustness, convergence, and performance. We used L=10 ms.

3.2.2 IR Registration

In some embodiments, on each iteration of an example optimization algorithm described herein, the simulated IR must be registered with the measured target IR so that it has the same time alignment and similar amplitude. This may be useful for correct operation of an example optimization algorithm described herein. If bins $S_{f,b}$ and $T_{f,b}$ do not correspond to the same time window in the IR, then the error between them can be very large and this can lead to incorrect results as the error grows on subsequent iterations. To rectify this, we propose a method for registering the IRs that is robust to the presence of noise in the measured IR. The registration operation is performed independently for every frequency band and at each optimization iteration. The first step is to compute the cross correlation between the IRs at every time offset. The simulated IR is then shifted in time to the offset where the cross correlation is highest. Once the IRs have been time aligned, the amplitudes may be matched. A significant problem with matching them robustly is that the signal-to-noise ratio (SNR) of the measured IR may be poor due to the presence of ambient noise. This noise produces incorrect registration which can lead to poor optimization performance. As a result, we only consider the bins in the IRs that have energy over the noise floor for both IRs. Given a signal-to-noise ratio for each IR, $SNR_T$ and $SNR_S$, we determine the noise floors to be $$\varepsilon_T = \frac{\max(T_f(t))}{SNR_T} \text{ and } \varepsilon_S = \frac{\max(S_f(t))}{SNR_S}.$$

For example, in the case of some measurement data, $SNR_T \approx 10^4$ and $SNR_S = \infty$. Then, an energy scale factor λ for the simulated IR that minimizes the $L_2$ error between all bins $T_{f,b} > \varepsilon_T$ and $S_{f,b} > \varepsilon_S$ is computed using a least-squares solver. $S_{f,b}$ is multiplied by λ to yield a simulated IR that is registered to the target measured IR. The registered IRs may be used on each iteration of an example optimization algorithm described herein to estimate the error for each IR bin.

3.2.3 Acoustic Simulation

In some embodiments, an example optimization algorithm described herein may involve the incorporation of sound transport information from virtual simulations within the scene's 3D reconstruction. We use a ray-based geometric sound propagation system that computes $S_f(t)$ directly as the sum of many individual ray paths, e.g., $S_f(t)=\Sigma\delta(t-t_j)I_{j,f}$ where $I_{j,f}$ is the sound intensity for path j and frequency band f, $t_j$ is the propagation delay time for path j, and δ(x) is the Dirac delta function. Along with $S_{f,t}$, the sound propagation system also computes a weight matrix, $W_f$, for each frequency band. $W_f$ has rows corresponding to the impulse response bins and columns corresponding to the material patches present in the scene. For IR bin b and patch m, the entry of $W_f$ may be given by $$w_{f,bm} = \frac{\Sigma I_{j,f} d_{j,m}}{\Sigma I_{j,f}}$$

where $d_{j,m}$ is the number of times that path j hit material patch m during its scene traversal. Therefore, $w_{f,bm}$ represents the average number of reflections from patch m for all paths that arrived at the listener during bin b, weighted according to the sound intensity of each path. Essentially, $W_f$ encodes the amount of influence each material patch has on every IR bin. The weight matrix is used during the optimization procedure to estimate the best changes to make to the material patches to minimize the error between $S_{f,b}$ and $T_{f,b}$. The error in decibels for bin b between the simulated and target IRs may be given by $E_{f,b}=dB(T_{f,b})-dB(S_{f,b})$ where $$dB(x) = \log_{10}\left(\frac{x}{I_0}\right)$$

and $I_0$ is the reference sound intensity.

3.2.4 Solver System

In some embodiments, In the case where there is just one sound propagation path per bin in the impulse response, the energy for a simulated impulse response bin may be given by:

$$S_{f,b} = \frac{P}{4\pi N}\prod_d R_{jfd} \qquad (1)$$

where P is the sound source's power, N is the number of primary rays emitted from the source, and $R_{jfd}$ is the frequency-dependent energy reflection coefficient encountered along path j at reflection bounce d. Converting $S_{f,b}$ to decibels by taking the logarithm allows the energy to be expressed as a linear combination of the logarithm of reflection coefficients:

$$dB(S_{f,b}) = dB\left(\frac{P}{4\pi N}\right) + \sum_d dB(R_{jfd}) \qquad (2)$$

In the approach of [26], this relationship is used to directly solve for the reflection coefficients that produce $dB(S_{f,b}) \approx dB(T_{f,b})$ in a least-squares sense. Given the weight matrix $W_f$ obtained during the simulation, the system of equations solved by [26] is roughly:

$$W_f dB(R_f) = dB(T_f) - dB\left(\frac{P}{4\pi N}\right) \quad (3)$$

where $R_f$ is a vector of the reflection coefficients for each material patch, and $T_f$ is a vector of the energy for the bins of the target impulse response. After solving for $dB(R_f)$, the reflection coefficients can be directly determined by inverting the decibel transform. This formulation requires a one-to-one correspondence between the propagation paths in the simulated and target impulse responses and so cannot be used in the presence of diffuse reflections or diffraction because these phenomena introduce scattering that "blurs" the boundaries between paths. Their approach also requires accounting explicitly for the effects of additional acoustic phenomena such as air absorption. In addition, since it is difficult to extract discrete paths from a measured impulse response, especially for late reverberation, the technique of [26] cannot be applied to real-world measurements.

To handle these problematic cases, we reformulate the optimization problem as an approximate iterative algorithm. In the general case where many paths are assigned to the same bin, the energy in each bin of the simulated IR may be given by:

$$S_{f,b} = \frac{P}{4\pi N} \Sigma_j \Pi_d R_{jfd} \quad (4)$$

This produces a non-linear system of equations that is difficult to handle accurately within the framework of [26]. Therefore we make the assumption that most of the paths in the same bin will hit a similar number of patches during the scene traversal. While this assumption introduces some error, it allows the use of a similar least-squares formulation. Rather than solving directly for the reflection coefficients, we instead iteratively estimate the change in decibels to each reflection coefficient that minimizes the error between the simulated and target IRs. This enables an example optimization algorithm described herein to automatically handle a wider range of acoustic phenomena and means that it is robust to external influence from noise. The system solved on each iteration may be given by:

$$W_f dB(\Delta R_f) = E_f \quad (5)$$

where $dB(\Delta R_f)$ is a vector of the change in decibels for each patch's reflection coefficient, and $E_f$ is a vector of the error between the simulated and target IRs in decibels for all IR bins. The reflection coefficients are then updated on each iteration by $R'_{f,m} = R_{f,m} \Delta R_{f,m}$. To enforce physical plausibility, the reflection coefficient should be constrained to the range $[R_{min}, R_{max}]$ encountered for typical real-world materials. We use $R_{min}=0.3$ and $R_{max}=0.999$. For other applications (e.g., architectural acoustics) it may be useful to apply additional constraints on material placement.

This approach can be easily extended to handle the case where there are multiple measured IRs. If $W_f^i$ is the weight matrix computed for IR i, then the final weight matrix $W_f$ used to solve the system for all IRs is formed by vertically concatenating the rows of each $W_f^i$. Similarly, if $E_f^i$ is the error in decibels for IR i, then the final error vector $E_f$ is the vertical concatenation of the various $E_f^i$. The final optimized materials may then incorporate information from every measured IR.

3.2.5 Optimization

In some embodiments, an example iterative constrained least-squares optimization algorithm described herein may begin with the initial materials for every patch in the scene as determined in Section 3.1 and an iterative constrained least-squares solver to modify the materials so that the simulation better matches the real-world scene. In some embodiments, steps at each iteration of an example optimization algorithm described herein may be summarized below:

1) For each IR in the scene, build the solver system:
   a) Compute simulated energy-time curve $S_f(t)$ and weight matrix $W_f$.
   b) Register simulated IR $S_f(t)$ to target measured IR $T_f(t)$.
   c) Bin $S_f(t)$ and $T_f(t)$ into energy-time histograms $S_{f,b}$ and $T_{f,b}$ with bin size L.
   d) Compute, $E_{f,b}$, the error in decibels between $S_{f,b}$ and $T_{f,b}$.
2) Solve least-squares system to get change in reflection coefficients, $\Delta R_{f,m}$.
3) Apply $\Delta R_{f,m}$ to material patches $R_{f,m}$, enforcing constraints.
4) Check termination conditions.

The algorithm terminates once a maximum number of iterations elapsing, if the average per-bin error is less than 1 decibel, or the algorithm converges to a local minimum.

4 Implementation

In this section, an example implementation of approach 300 containing various aspects described herein is discussed.

3D Model Reconstruction: In some embodiments, a 3D reconstruction of each real-world scene (e.g., a room) may be generated using a few hundred RGB-D images captured with a Microsoft Kinect at 640×480 resolution. The reconstruction algorithm may utilize high-level plane primitive constraints and SIFT features [33] to compute the 3D triangle mesh that is used as an input by our acoustic classification and optimization algorithm. The captured images may also be used as the input to a visual material classification algorithm described herein. In some embodiments, all material classifications may be performed using the Caffe deep learning framework [48] and MINC patch classifier models [42] on an Nvidia GTX 960.

Figure 5:
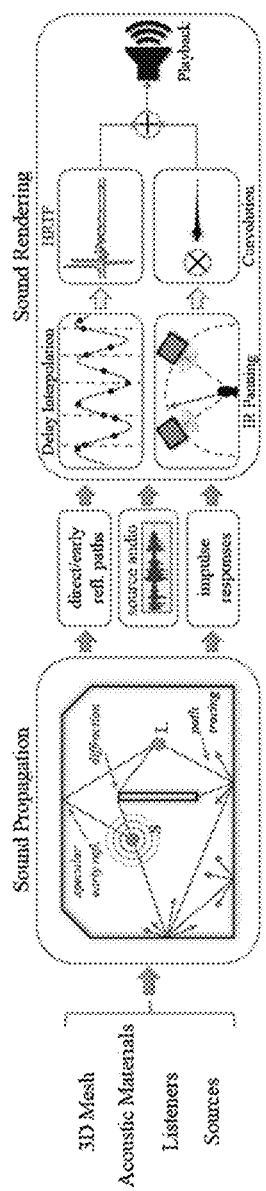
FIG. 5 is a diagram illustrating an overview of an example sound propagation and rendering system.

Sound Propagation and Rendering: FIG. 5 is a diagram illustrating an overview of an example sound propagation and rendering system 500. Referring to FIG. 5, system 500 may include separate modules (e.g., software or logic executing on one or more processors) for computing sound propagation using different methods or techniques. For example, system 500 may compute sound propagation for a virtual scene based on a real-world scene using separate modules for specular early reflections, diffraction, and path tracing. The result computed by system 500 may be auralized using a combination of delay interpolation for direct and early reflections paths, as well as convolution with the impulse response for late reverberation. HRTF-based spatial sound may be applied to direct and early paths, while vector-based amplitude panning may used for an impulse response. In some embodiments, the propagation path computation may also used by the optimization algorithm in Section 3.2.

In some embodiments, a combination of the image source method for specular early reflections [14], diffuse path tracing for late reverberation [17], [19], and the UTD diffraction model for approximating edge diffraction [20] may be used in computing sound propagation. In some embodiments, sounds in system 500 may be computed in 8 octave frequency bands centered at 63.5 Hz, 125 Hz, 250

Hz, 500 Hz, 1 kHz, 2 kHz, 4 kHz, and 8 kHz. The paths computed by the underlying propagation algorithm may be used in a material optimization algorithm described herein. The result of sound propagation may include an impulse response for every source and listener pair in the scene. The impulse response may be spatialized using vector-based amplitude panning [49] and the unprocessed dry source audio is convolved with the IR. Perceptually important sound paths, such as the direct and early reflection paths, may also be computed separately from the impulse response so that linear delay interpolation [50] and HRTF spatial sound can be applied independently for each path. In some embodiments, outputs of delay interpolation and convolution rendering may be mixed and then sent to the audio device for playback over headphones.

Acoustic Measurements: In some embodiments, the ground-truth acoustic measurements for an example optimization approach described herein may include impulse responses at various source and listener locations in real-world scenes. For example, acoustic measurements may be captured using complimentary Golay codes [51] played through a JBL LSR4328P speaker and captured by a Beyerdynamic MM1 omnidirectional measurement microphone. An example measurement setup is depicted in FIG. 2 (d). In some embodiments, acoustic measurements for each room (e.g., scene) may take about 20-30 minutes, including the time to setup the equipment.

In some embodiments, four impulse responses may be measured for each scene, where the four impulse responses correspond to 4 different speaker/microphone pairs. Each IR may be measured 20 separate times and then the results may be averaged to reduce the amount of noise present. These measured IRs may be used for auralization and may also be used during an example optimization algorithm described herein. The positions and orientations of the microphone and speaker with respect to the 3D reconstruction may also be measured and entered into the simulation. In order to correctly replicate the directional characteristics of the speaker in the sound propagation simulation, the directional transfer function of the speaker in free space at 15 azimuths and 4 elevations may also be measured for a total of 60 measurements. The magnitude response of the transfer function in the 8 octave frequency bands may be used to model the directional speaker in an example simulation described herein so that there is better correspondence with the measured IRs. Overall, the audio capture requirements of an example approach described herein may be low and robust to measurement errors from consumer audio equipment (e.g., with nonlinear microphone or speaker frequency response). In situations with low background noise, the impulse response may even be estimated by recording the result of the user clapping their hands.

5 Results and Evaluation

In this section, results and evaluation metrics for an example implementation of approach 300 containing various aspects described herein is discussed.

An example implementation of approach 300 has been evaluated using several indoor real-world scenes typical of an office environment. The major characteristics and results of this implementation for these scenes after being evaluated are summarized in FIG. 8. The results for the visual material classification used in this implementation are shown in FIGS. 6A-B.

Figure 6A:
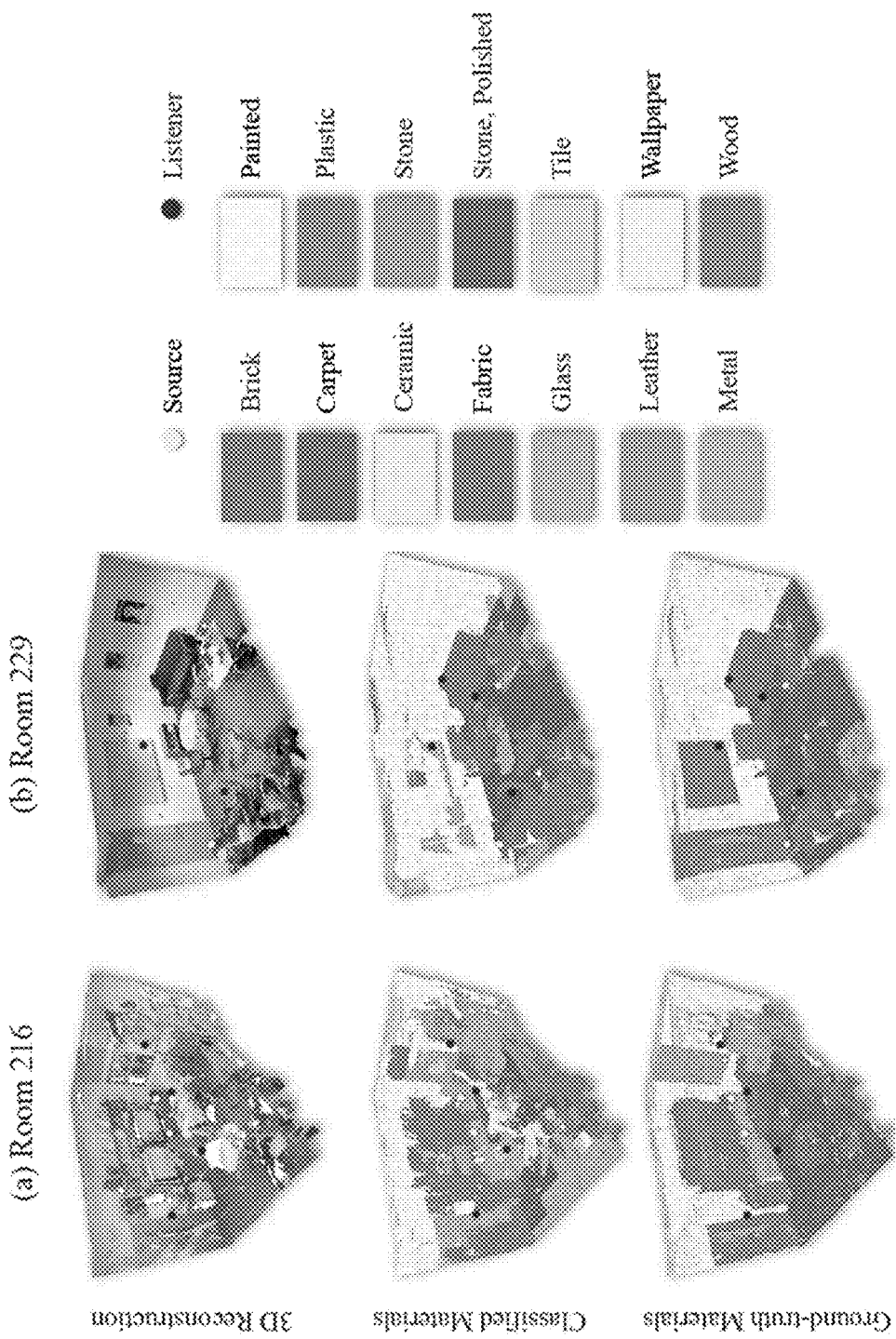
FIGS. 6A-B depict results for an example visual material classification algorithm for four benchmark scenes.
Figure 6B:
Figure 7A:
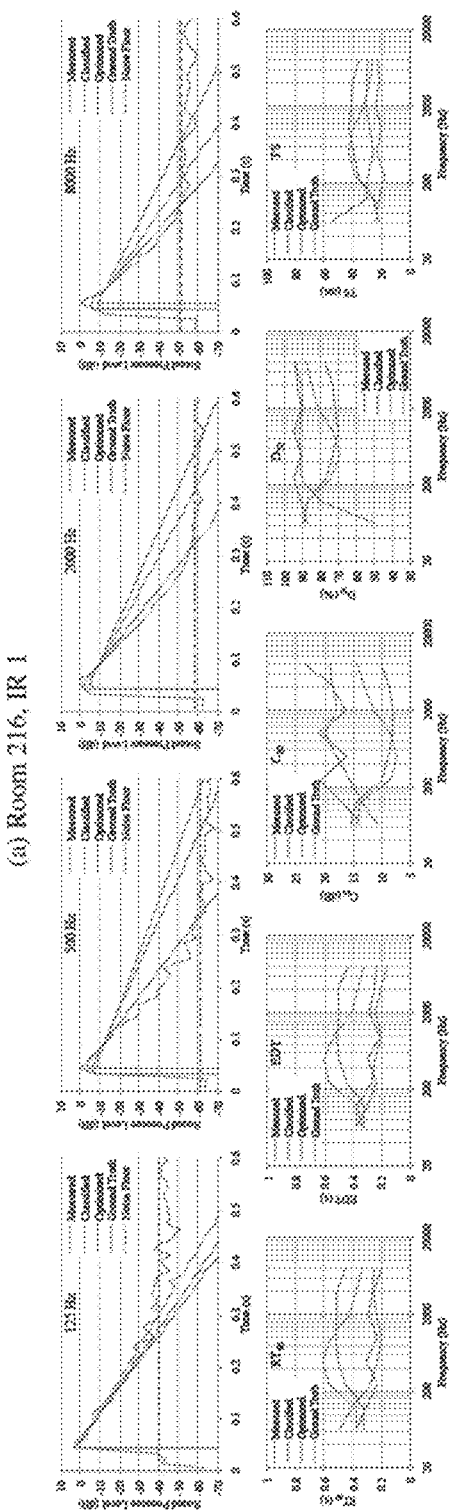
FIGS. 7A-D depict results for an example optimization algorithm for four benchmark scenes.
Figure 7B:
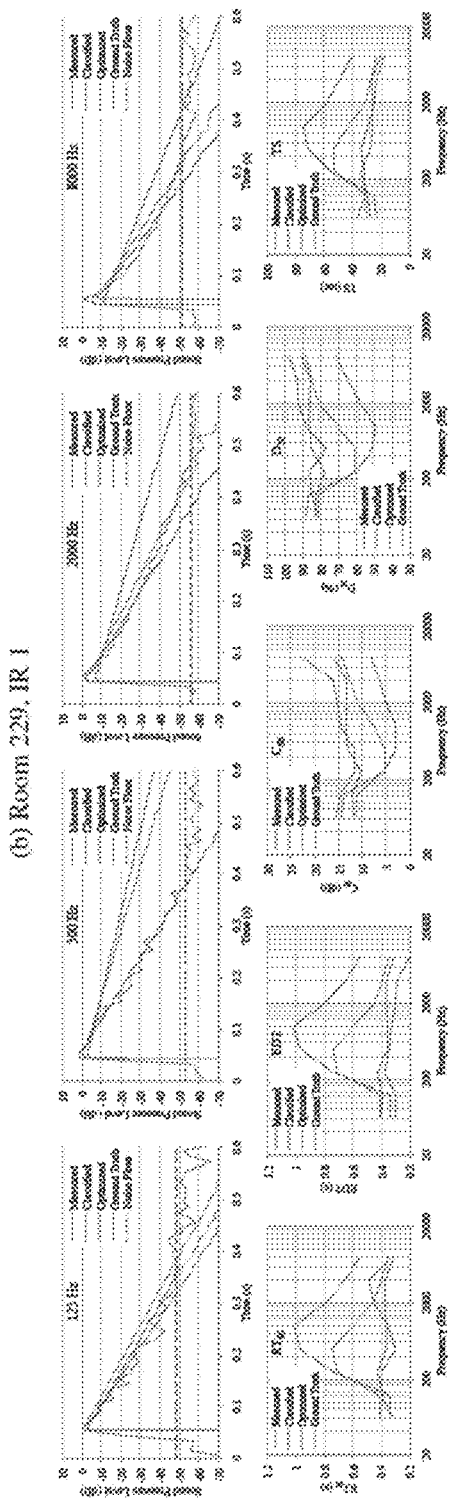
Figure 7C:
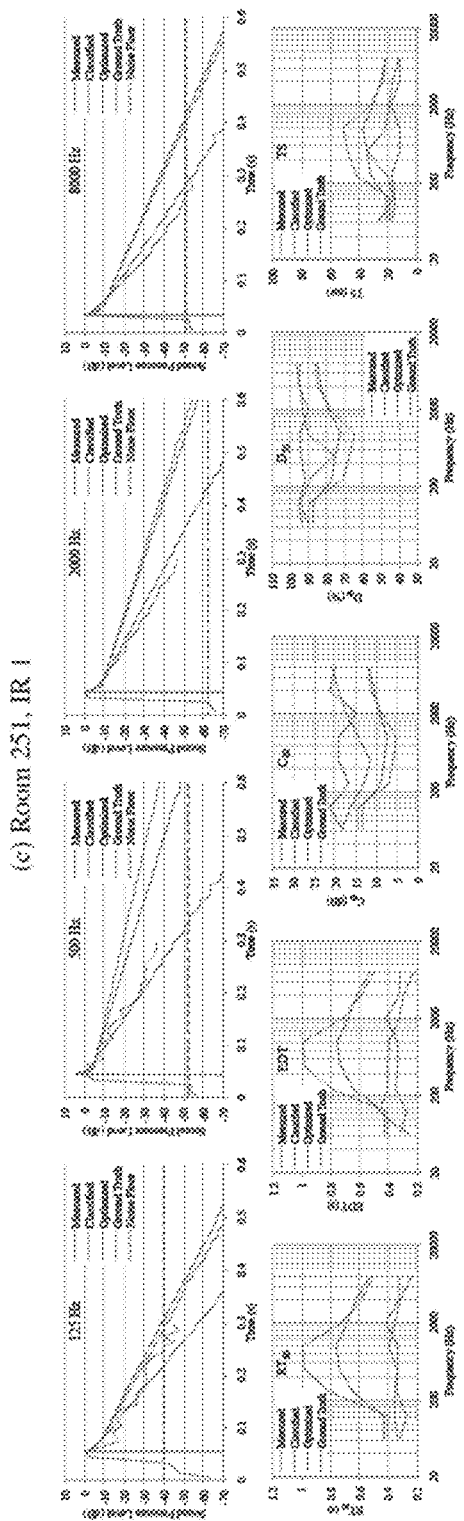
Figure 7D:
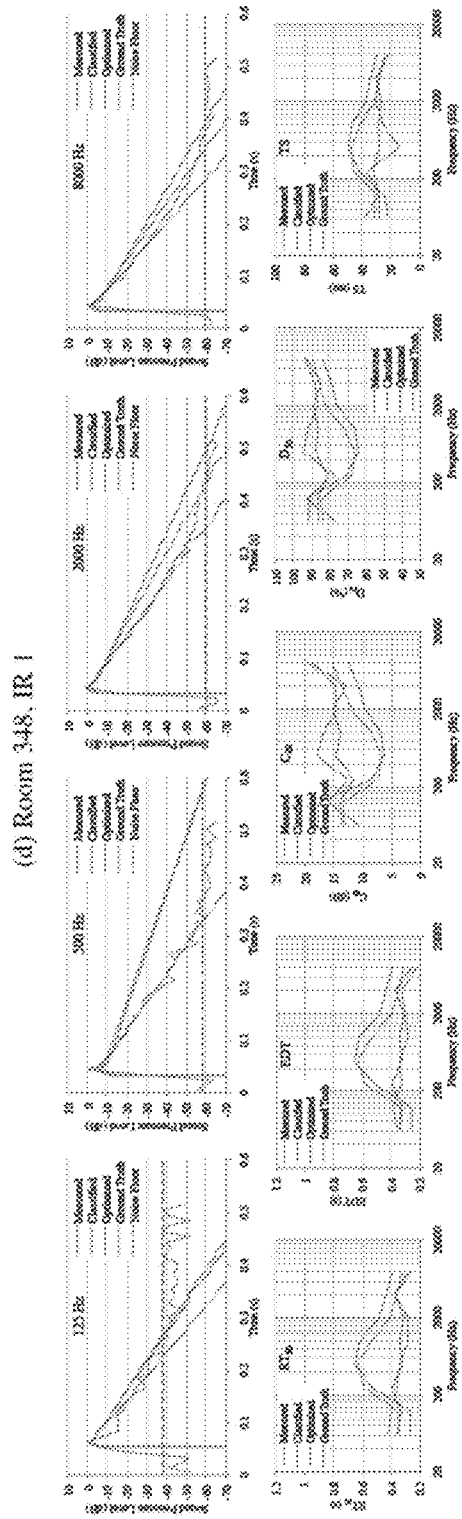

FIGS. 6A-B depict results for an example visual material classification algorithm for four benchmark scenes. Referring to FIGS. 6A-B, shades of grey indicate the material category that has been assigned to each triangle of the reconstructed model. Each middle row (labeled "Classified Materials") of FIGS. 6A-B shows the results of our material classification, and each bottom row (labeled "Ground-truth Materials") shows the manually-generated ground-truth classification that are used for validation. The source and listener positions for the acoustic measurements within the real room are shown as white and black circles, respectively. These positions may be used to optimize the acoustic materials present in the scenes.

The output of the classification approach may be compared to a manually segmented mesh that is used as the ground truth. Overall, about 48% of the triangles in the scenes are correctly classified. For some of the materials that are incorrectly labeled (e.g., the carpet floor in Room 229 labeled as "Stone, polished"), it is possible that the CNN is unable to tell the difference between certain types of visually similar materials. A possible explanation for these results is that the input image resolution used in an example implementation of aspects described herein is less than half of the training images for the MINC dataset (1100 px vertical dimension), and the RGB images contain lots of noise. There is not enough salient high frequency information in the input images for the CNN to detect all of the material types. Another shortcoming of an example automatic acoustic material classification described herein is that the CNN may not accurately predict materials that require higher-level knowledge of the scene. For instance, some of the test rooms contain posters on the wall that have negligible effect on the acoustics, and so the wall material (e.g., "painted") should be used. However, the CNN can be confused in these situations and produces incorrect predictions that cannot be rectified without high-level knowledge of how sound propagates through materials.

On the other hand, an evaluated optimization implementation used for computation of absorption coefficients produces good results. The coefficients are used by sound propagation and rendering system 500 described herein (FIG. 5) to generate interactive sound effects. The evaluated optimization implementation is able to generate high-quality sound and takes only a few minutes to compute the optimized absorption coefficients. The results of the evaluated optimization algorithm is shown in FIGS. 7A-D.

FIGS. 7A-D depict results for an example optimization algorithm for four benchmark scenes. As depicted in FIGS. 7A-D, energy-time curves and several standard acoustic parameters for the measured IRs (measured) are compared to the results before optimization (classified) and the optimized results (optimized). We also show the results for manually-segmented materials without optimization (ground truth). The energy-time curves are presented for four different octave frequency bands with center frequencies 125 Hz, 500 Hz, 2000 Hz, and 8000 Hz. The noise floor corresponds to the signal to noise ratio of the measured IR for each frequency band.

Referring to FIGS. 7A-D, energy-time histograms are depicted for the 125 Hz, 500 Hz, 2,000 Hz and 8,000 Hz frequency bands. For each band, measured data is compared to the results produced directly after material classification, as well as the final results generated by an example optimization algorithm described herein. Before optimization, there are several significant mismatches with the measured data, especially in the mid-frequency bands. This can be partially explained by error during classification, though another significant factor is the table of measured absorption coefficients (see FIG. 4), which may not always be valid for general scenes with various wall construction techniques. When the classified results are compared to the ground truth materials (before optimization), we observe similar error for both with respect to the measured data. This supports the conclusion that the material database does not match well to the test rooms.

After optimization is applied, the impulse responses are much closer to the measured data. Overall, the optimization results are very close for the mid frequencies (500-1000 Hz), with an average error of just 1-2 dB. At low frequencies there is a substantial amount of noise in the measured data, and the energy decay is not very smooth. This causes some error when compared to the optimized results that have a perfectly smooth energy decay curve. At high frequencies, we observe that the measured IRs tend to decay at a decreasing rate over time (e.g., not linear in decibels). This is most visible for Room 229 in the 8 kHz frequency band. Our simulation does not reproduce this effect and it generates completely linear decay curves. This is an additional source of error that may require more sophisticated sound propagation algorithms to rectify. Noise in the measured IRs also makes it difficult to precisely match the energy decay for the entire impulse response decay. If the noise floor is set too high, then not all of the IR is considered during optimization. If the noise floor is set too low, such that the optimization considers the noise to be part of the IR, then it tends to produce a result with slower incorrect decay rate. Setting the signal to noise ratio for each IR and frequency band is important for correct operation of the algorithm.

The results for several standard acoustic parameters: reverberation time (RT60), early decay time (EDT), clarity (C80), definition (D50), and center time (TS) are also compared. For the RT60 and EDT, the optimized results are close to the measured results for most frequencies, and the average error is 0.08 s. There are some mismatches at low frequencies, but these are explained by noise at the end of the IR incorrectly increasing the reported decay rates for RT60. The EDT parameter is less sensitive to this noise because it only considers the first 10 dB of energy decay. The C80, D50, and TS parameters consider the ratio of early to late sound in different ways. The results for these parameters are mixed. In some cases the optimized parameters are very close to the measured data (e.g., 1 dB), but for others there are significant differences (e.g., over 5 dB). A few errors are caused by noise impacting the computation of the parameters. In particular, for the computation of C80 and D50, it is important to know the time of first arrival in the IR. If this time is not determined accurately, it can cause significant differences in the reported parameters. Overall, an example optimization algorithm described herein is able to match the measured data reasonably well, though there may be room for future improvement.

Analysis: The accuracy of an example implementation of approach 300 may depend on four main components: the quality of the reconstructed 3D mesh model, resolution of the input images and machine learning approach for material classification, the database of acoustic materials, and the sound propagation model. While we may not need to reconstruct some small features of the scene (e.g., the door knob or a book on the shelf), it is important that we get nearly watertight meshes with only small holes, otherwise the sound waves can 'leak' from those models. Furthermore, the reconstruction algorithm may not capture some hidden areas that affect the sound propagation characteristics (e.g., hidden resonant cavities or non-line-of-sight large objects). It is important to acquire high resolution input images of the scene, as that affects the accuracy of the classification algorithm. Ideally, we want to use classifier models that are trained in terms of acoustic material categories and take into account the relationship between the visual appearance and the acoustic properties, but such data does not exist. As more acoustic material databases are becoming available, we can use them to increase the fidelity of an example visual material classification algorithm described herein. Finally, an example optimization approach described herein is based on geometric sound propagation which may not accurately simulate all sound phenomena. As a result, the optimization may not produce impulse responses that are identical to the measured ones. Ultimately, we would like to use more accurate models for sound propagation such as wave-based methods like the Boundary Element Method, but that would increase the computational complexity of an example optimization algorithm described herein substantially. Interestingly, all these four components are active areas of research in different research communities: computer vision, learning, acoustics, and scientific computation.

Applications: An example technique described herein has many possible applications where it is useful to generate physically-based sound effects for real-world scenes. On such application is teleconferencing. When a remote person is speaking, the sound from their voice can be auralized as if they are within the room. By combining an example technique described herein with head or face tracking, it may also be possible to estimate the IR between a human voice and microphone. This IR can be deconvolved with the microphone audio to approximate the dry sound from the voice. Another application is to use virtual sound sources to provide feedback for an augmented reality user interface. For example, a virtual character that is overlaid onto the real world could communicate with the user. An example technique described herein may allow the character's voice to be auralized as if it was within the real environment. The audio could be presented through open-back headphones that produce virtual sound with little attenuation of the external sound.

6 User Evaluation

In this section, results from a preliminary user study are discussed. The study evaluates the perceptual accuracy of an implementation of approach 300 in terms of generating plausible sounds in real-world scenes.

Study Design: In the study, sound auralized using measured impulse responses, referred to as measured, is compared to the sound simulated using an example technique described herein both before and after absorption coefficient optimization, referred to as classified and optimized, respectively. We evaluated 2 comparison conditions: measured vs. classified and measured vs. optimized. For each case, we tested 2 source and listener pairs for each of the 4 scenes, for a total of 16 comparisons. The study was conducted as an online survey where each subject was presented with a 16 pairs of identical videos with different audio in a random order and asked two questions about each pair. The questions were (a) "which video has audio that more closely matches the visual appearance of the scene?" and (b) "how different is the audio in the videos?". The responses were recorded on a scale from 1 to 11. For the first question, an answer of 1 indicates the audio from the left video matched the visuals better, an answer of 11 indicates the audio from the right video matched the visuals better, and an answer of 6 indicates the videos were equal. On the second question, an answer of 1 indicates the videos sounded extremely similar, while an answer of 11 indicates the videos sounded very different. Some research hypotheses were: (1) the optimized case has sound with the same level of audio-visual correlation as the measured case and better correlation than the classified case; (2) The sound generated in the optimized case will be more similar to that from the measured case than the sound from the classified case.

Study Procedure: The study was completed by a total of 19 subjects between the ages of 18 and 61, made up of 17 males and 2 females. The average age of the subjects was 28, and all subjects had normal hearing. At the start of the study, subjects were given detailed instructions and filled out a demographic information questionnaire. Subjects were required to use either headphones or earbuds when taking the study, and they were asked to calibrate their listening volume using a test audio clip. Subjects were then presented the 16 pairs of videos and responded to the questions for each pair. The subjects were allowed to replay the videos as many times as needed, and they were able to move forward and backward in the study to change their answers if necessary. After rating the 16 video pairs, the study was completed.

FIG. 8 is a diagram illustrating example scene details 800 of four benchmark scenes. Referring to FIG. 8, details 800 are depicted in a table format and include physical dimensions of each room (e.g., scene) and the geometric complexity of the 3D reconstructed mesh models after simplification, as well as the RT60 values computed from the IRs. Details 800 also include the amount of time the material classification and the optimization algorithms are executed, as well as the percentage of scene surface area correctly classified.

6.1 User Evaluation Results

Figure 9:
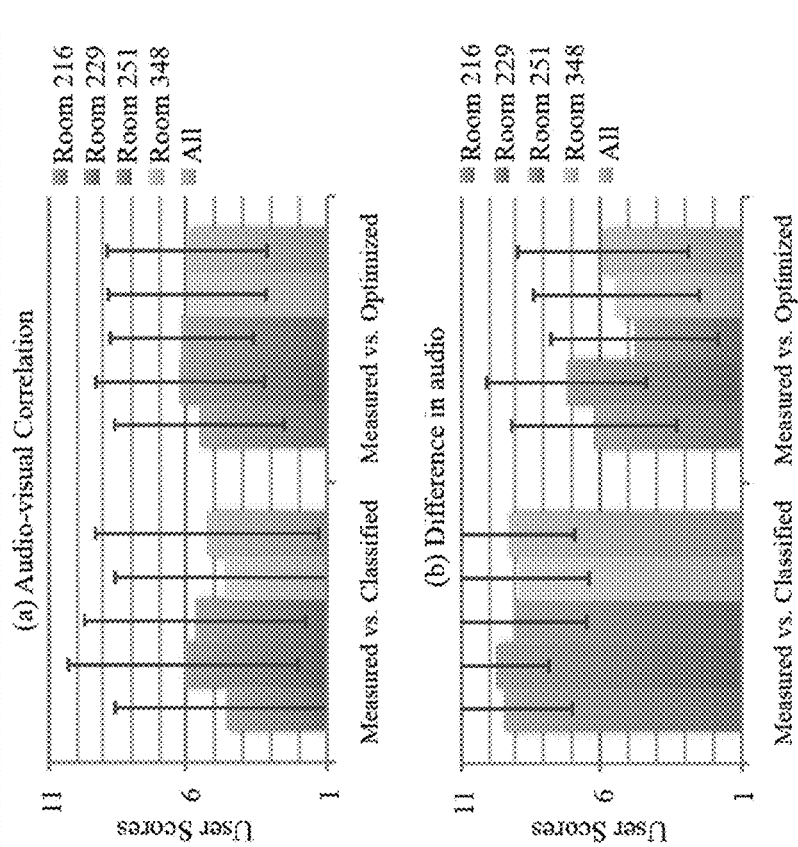
FIG. 9 is a diagram illustrating user evaluation results.

FIG. 9 is a diagram illustrating user evaluation results 900. In FIG. 9, user evaluation results 900 are depicted for measured case versus classified case and for measured case versus optimized case for 4 scenes and 2 questions. For question (a), a score below 6 indicates higher audio-visual correlation for the first method in the comparison, whereas a score above 6 indicates higher audio-visual correlation for the second method. For question (b), the higher the score, the more dissimilar the audio for the two cases under comparison. Error bars indicate the standard deviation of the responses.

Referring to user evaluation results 900, a two-tailed one-sample t-test across all scenes was used to test hypothesis 1. For question (a), the subjects indicated the video with the audio that more closely matched the visual appearance of the scene. For the comparison between the measured case and the classified case, the measured case is slightly preferred (p=0.038), with an average score of 5.3 across the scenes. This indicates that the raw output of an example classification approach described herein does not match the visual appearance of the scene very closely. However, the comparison between the measured and optimized cases indicates that there is no preference for either case (p=0.82), with an average score of 6.1. The low significance supports a first hypothesis that the level of audio-visual correlation for the measured and optimized cases is similar. Therefore, an example approach described herein is suitable for augmented reality applications that require generating virtual audio that matches the appearance of the real-world scene.

For question (b), the audio differences between the 3 cases were considered. When comparing the audio from the measured and classified case, the average user score was 9.3, suggesting strong differences in the audio. On the other hand, the audio from the optimized case was more similar to the measured audio, with an average user score of 5.9. When the second hypothesis is evaluated using a two-tailed Welch's t-test, we find that the optimized sound has much fewer differences as compared to the measured audio than the sound without optimization (p<0.001). This suggests that the optimization step is important for generating sound that is close to the real-world scene.

7 Conclusion and Future Work

The present subject matter discloses novel aspects related to acoustic material classification and optimization for 3D reconstructions of real-world scenes. One approach described herein uses a CNN classifier to predict the material categories for 3D mesh triangles, then iteratively adjusts the reflection coefficients of the materials until simulated impulse responses matches or substantially matches corresponding measured impulse responses. We evaluated this technique on several room-sized real-world scenes and demonstrated that it can automatically generate acoustic material properties and plausible sound propagation effects. We used the results for multimodal augmented reality that combines real-world visual rendering with acoustic effects generated using sound propagation. Initial results are promising and we also conducted a preliminary user study that suggests that such simulated results are indistinguishable from the measured data.

In some embodiments, the accuracy of one approach described herein may be governed by the sensor resolution and underlying 3D model reconstruction algorithms. In such embodiments, if the input images for a material classification system have low resolution, one approach described herein may not work well in this case. In some embodiments, the size and extent of MINC material categories may also affect results. For example, an approach of assigning measured material data to MINC material categories can produce incorrect results if the number of categories is small and/or if the current MINC CNN model does not handle all real-world material variation. However, a material optimization technique proposed in Section 3.2 can be usable for adjusting the absorption coefficients so that the simulation is more consistent with acoustic measurements from the real-world scene. There are many avenues for future work in this domain. Most work in computer vision has been targeted towards 3D model reconstruction for visual rendering, and we need different criteria and techniques for sound rendering, as described in Section 2.

It will be appreciated that there measured data corresponding to acoustic-BRDFs for many real-world materials may be lacking and that it would be useful to extend recent work on visual material property acquisition [7] to acoustic materials. It will be appreciated that one-to-one mapping between visual material categories and acoustic material data may not always exist. In some embodiments, acoustic classification and optimization may be improved by training CNN models for new material types that disambiguate between specific acoustic material categories (e.g., painted vs. unpainted brick). We have only considered the effects of the absorption/reflection coefficient on the impulse response. It will be appreciated that better results may be obtained by simultaneously optimizing for other material attributes like the scattering coefficients, or by considering acoustic metrics like RT60 the early decay time (EDT) or clarity (C80) as constraints. It will be appreciated that evaluation of larger scenes, e.g., larger indoor scenes with varying reverberation effects (e.g., cathedrals, concert halls), as well as outdoor scenes, may benefit for various aspects described herein.

Figure 10:
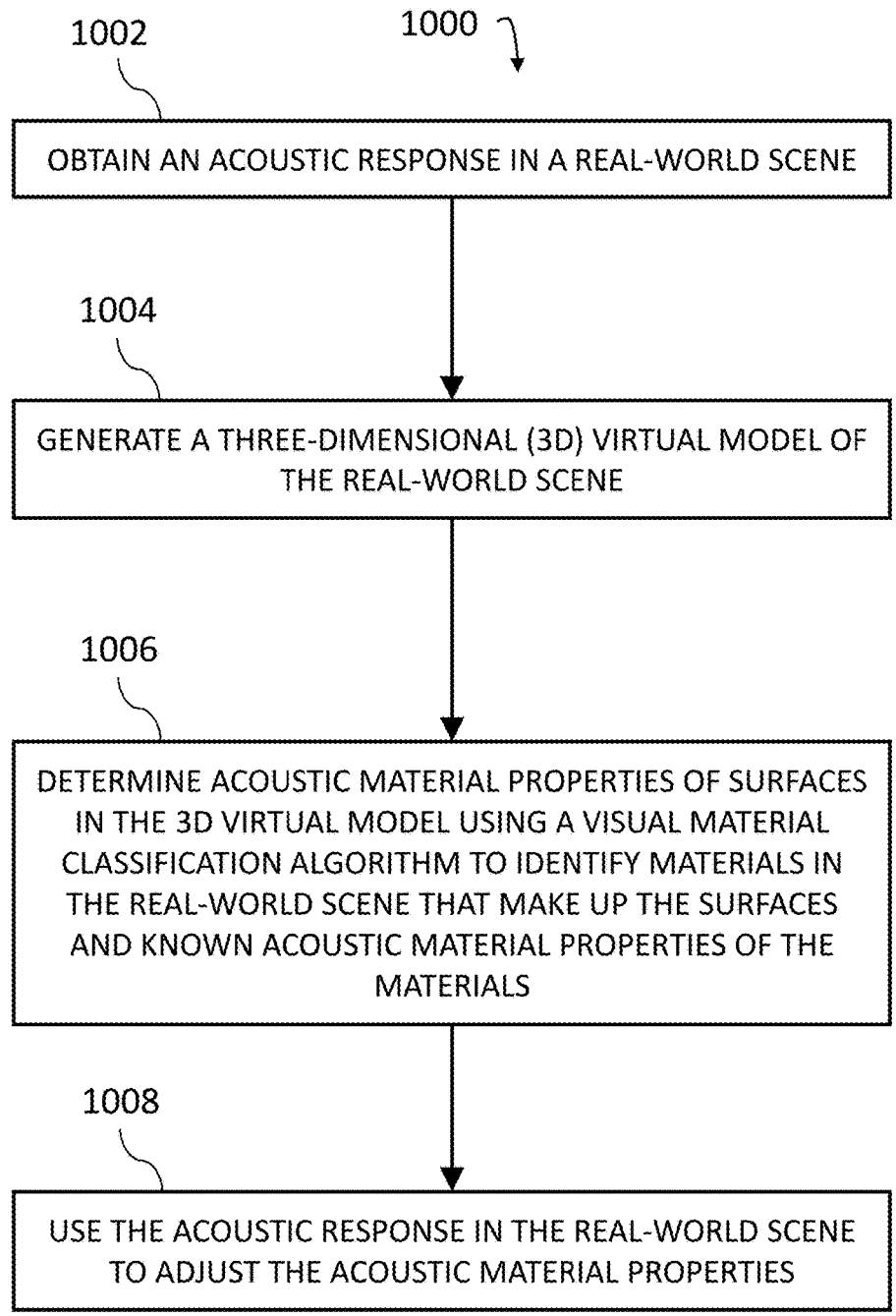
FIG. 10 is a diagram illustrating an example process for determining acoustic material properties associated with a real-world scene.

FIG. 10 is a diagram illustrating an example process 1000 for determining acoustic material properties associated with a real-world scene. In some embodiments, example process 1000, or portions thereof, may be performed by or at SPM 110, processor core(s) 108, node 102, and/or another node or module.

In step 1002, an acoustic response in a real-world scene may be obtained. For example, an acoustic response associated with a real-world scene may be obtained using at least one speaker to output sound and at least one microphone to record the sound.

In step 1004, a 3D virtual model of the real-world scene may be generated. For example, generating a 3D virtual model may include using camera images from multiple viewpoints or a structured-light depth camera.

In step 1006, acoustic material properties of surfaces in the 3D virtual model may be determined using a visual material classification algorithm to identify materials in the real-world scene that make up the surfaces and known acoustic material properties of the materials. For example, acoustic material properties may include frequency-dependent absorption coefficients.

In some embodiments, a visual material classification algorithm comprises performing, using images of a real-world scene and a CNN based material classifier, a visual material segmentation, wherein the visual material segmentation indicates material classification probabilities for triangles associated with the 3D virtual model; identifying, using a patch segmentation algorithm, patches associated with the 3D virtual model, wherein each patch represents a localized group of triangles appearing to be a same material; and determining, using the material classification probabilities, material classifications for the patches, where each material classification may be associated with predetermined acoustic material properties.

In step 1008, the acoustic response in the real-world scene may be used to adjust the acoustic material properties.

In some embodiments, using an acoustic response in a real-world scene to adjust acoustic material properties may comprise using an optimization algorithm that iteratively modifies the acoustic material properties until a simulated acoustic response of an acoustic simulation in a 3D virtual model is similar to the acoustic response in the real-world scene or until a termination condition is met.

In some embodiments, an acoustic simulation may include a sound propagation model based on a specular early diffraction method, a diffraction method, or a path tracing method.

In some embodiments, a simulated acoustic response may be associated with a listener position and a source position that correspond to a listener position and a source position associated with an acoustic response associated with a real-world scene.

In some embodiments, a termination condition may include a predetermined number of iterations elapsing, an error value being equal to, less than, or more than a predetermined value, or the optimization algorithm converging to a local minimum.

REFERENCES

The disclosures of all of the references listed herein are hereby incorporated herein by reference in their entireties.

[1] A. Härmä, J. Jakka, M. Tikander, M. Karjalainen, T. Lokki, J. Hiipakka, and G. Lorho, "Augmented reality audio for mobile and wearable appliances," *Journal of the Audio Engineering Society*, vol. 52, no. 6, pp. 618-639, 2004.

[2] P. Larsson, A. Väljamäe, D. Västfjäll, A. Tajadura-Jiménez, and M. Kleiner, "Auditory-induced presence in mixed reality environments and related technology," in *The Engineering of Mixed Reality Systems*. Springer, 2010, pp. 143-163.

[3] M. D. Egan, *Architectural Acoustics*. McGraw-Hill Custom Publishing, 1988.

[4] H. Kuttruff, *Acoustics: An Introduction*. CRC Press, 2007.

[5] H. S. Seddeq, "Factors influencing acoustic performance of sound absorptive materials," *Aust. J. Basic Appl. Sci*, vol. 3, no. 4, pp. 4610-7, 2009.

[6] J. H. Rindel and C. L. Christensen, "Odeon, a design tool for noise control in indoor environments," in *Proceedings of the International Conference Noise at work. Lille*, 2007.

[7] M. Weinmann and R. Klein, "Advances in geometry and reflectance acquisition," in *SIGGRAPH Asia 2015 Courses*, ser. SA '15, 2015, pp. 1:1-1:71. [Online]. Available: http://doi.acm.org/10.1145/2818143. 2818165

[8] J. Blauert, *Spatial hearing: the psychophysics of human sound localization*. MIT press, 1997.

[9] L. L. Thompson, "A review of finite-element methods for time-harmonic acoustics," *J. Acoust. Soc. Am*, vol. 119, no. 3, pp. 1315-1330, 2006.

[10] N. Raghuvanshi, R. Narain, and M. C. Lin, "Efficient and accurate sound propagation using adaptive rectangular decomposition," *Visualization and Computer Graphics, IEEE Transactions on*, vol. 15, no. 5, pp. 789-801, 2009.

[11] R. D. Ciskowski and C. A. Brebbia, *Boundary element methods in acoustics*. Springer, 1991.

[12] R. Mehra, N. Raghuvanshi, L. Antani, A. Chandak, S. Curtis, and D. Manocha, "Wave-based sound propagation in large open scenes using an equivalent source formulation," *ACM Transactions on Graphics (TOG)*, vol. 32, no. 2, p. 19, 2013.

[13] N. Raghuvanshi, J. Snyder, R. Mehra, M. Lin, and N. Govindaraju, "Precomputed wave simulation for real-time sound propagation of dynamic sources in complex scenes," in *ACM Transactions on Graphics (TOG)*, vol. 29, no. 4. ACM, 2010, p. 68.

[14] J. Borish, "Extension to the image model to arbitrary polyhedra," *The Journal of the Acoustical Society of America*, vol. 75, no. 6, pp. 1827-1836, June 1984.

[15] T. Funkhouser, I. Carlbom, G. Elko, G. Pingali, M. Sondhi, and J. West, "A beam tracing approach to acoustic modeling for interactive virtual environments," in *Proc. of ACM SIGGRAPH*, 1998, pp. 21-32.

[16] M. Taylor, A. Chandak, L. Antani, and D. Manocha, "Resound: interactive sound rendering for dynamic virtual environments," in *MM '09: Proceedings of the seventeen ACM international conference on Multimedia*. ACM, 2009, pp. 271-280.

[17] M. Vorländer, "Simulation of the transient and steady-state sound propagation in rooms using a new combined ray-tracing/image-source algorithm," *The Journal of the Acoustical Society of America*, vol. 86, no. 1, pp. 172-178, 1989.

[18] J. J. Embrechts, "Broad spectrum diffusion model for room acoustics raytracing algorithms," *The Journal of the Acoustical Society of America*, vol. 107, no. 4, pp. 2068-2081, 2000.

[19] C. Schissler, R. Mehra, and D. Manocha, "High-order diffraction and diffuse reflections for interactive sound propagation in large environments," *ACM Transactions on Graphics (SIGGRAPH 2014)*, vol. 33, no. 4, p. 39, 2014.

[20] N. Tsingos, T. Funkhouser, A. Ngan, and I. Carlbom, "Modeling acoustics in virtual environments using the uniform theory of diffraction," in *Proc. of ACM SIGGRAPH*, 2001, pp. 545-552.

[21] U. P. Svensson, R. I. Fred, and J. Vanderkooy, "An analytic secondary source model of edge diffraction impulse responses," *Acoustical Society of America Journal*, vol. 106, pp. 2331-2344, November 1999.

[22] G. Mückl and C. Dachsbacher, "Precomputing sound scattering for structured surfaces," in *Proceedings of the 14th Eurographics Symposium on Parallel Graphics and Visualization*, 2014, pp. 73-80.

[23] ISO, "ISO 354, Acoustics—Measurement of sound absorption in a reverberation room." *International Standards Organisation*, no. 354, 2003.

[24] C. L. Christensen and J. H. Rindel, "A new scattering method that combines roughness and diffraction effects," in *Forum Acousticum*, Budapest, Hungary, 2005.

[25] M. Monks, B. M. Oh, and J. Dorsey, "Audioptimization: goal-based acoustic design," *Computer Graphics and Applications, IEEE*, vol. 20, no. 3, pp. 76-90, 2000.

[26] K. Saksela, J. Botts, and L. Savioja, "Optimization of absorption placement using geometrical acoustic models and least squares," *The Journal of the Acoustical Society of America*, vol. 137, no. 4, pp. EL274-EL280, 2015.

[27] G.-P. Nava, "Inverse sound rendering: In-situ estimation of surface acoustic impedance for acoustic simulation and design of real indoor environments," Ph.D. dissertation, 2007.

[28] C. L. Christensen, G. Koutsouris, and J. H. Rindel, "Estimating absorption of materials to match room model against existing room using a genetic algorithm," in *Forum Acusticum* 2014, At Krakow, Poland, 2014.

[29] K. Chen, Y.-K. Lai, and S.-M. Hu, "3d indoor scene modeling from rgb-d data: a survey," *Computational Visual Media*, vol. 1, no. 4, pp. 267-278, 2015.

[30] J. Bathe, E. Mouaddib, and J. Salvi, "Recent progress in coded structured light as a technique to solve the correspondence problem: a survey," *Pattern recognition*, vol. 31, no. 7, pp. 963-982, 1998.

[31] D. Scharstein and R. Szeliski, "High-accuracy stereo depth maps using structured light," in *IEEE Computer Vision and Pattern Recognition.*, vol. 1. IEEE, 2003, pp. 1-195.

[32] R. A. Newcombe, S. Izadi, O. Hilliges, D. Molyneaux, D. Kim, A. J. Davison, P. Kohi, J. Shotton, S. Hodges, and A. Fitzgibbon, "KinectFusion: Real-time dense surface mapping and tracking," in *Mixed and augmented reality (ISMAR), 2011 10th IEEE international symposium on*. IEEE, 2011, pp. 127-136.

[33] M. Dou, L. Guan, J.-M. Frahm, and H. Fuchs, "Exploring high-level plane primitives for indoor 3d reconstruction with a hand-held rgb-d camera," in *Computer Vision-ACCV 2012 Workshops*. Springer, 2013, pp. 94-108.

[34] C. Liu, A. G. Schwing, K. Kundu, R. Urtasun, and S. Fidler, "Rent3d: Floor-plan priors for monocular layout estimation," in *Proceedings of the IEEE Conference on Computer Vision and Pattern Recognition*, 2015, pp. 3413-3421.

[35] M. Sormann, C. Zach, J. Bauer, K. Karner, and H. Bishof, "Watertight multi-view reconstruction based on volumetric graph-cuts," in *Image analysis*. Springer, 2007, pp. 393-402.

[36] S. Y. Bao, A. Furlan, L. Fei-Fei, and S. Savarese, "Understanding the 3d layout of a cluttered room from multiple images," in *Applications of Computer Vision (WACV), 2014 IEEE Winter Conference on*. IEEE, 2014, pp. 690-697.

[37] S. Siltanen, T. Lokki, L. Savioja, and C. Lynge Christensen, "Geometry reduction in room acoustics modeling," *Acta Acustica united with Acustica*, vol. 94, no. 3, pp. 410-418, 2008.

[38] S. Pelzer and M. Vorländer, "Frequency- and time-dependent geometry for real-time auralizations," in *Proceedings of 20th International Congress on Acoustics, ICA*, 2010.

[39] C. Liu, L. Sharan, E. H. Adelson, and R. Rosenholtz, "Exploring features in a bayesian framework for material recognition," in *Computer Vision and Pattern Recognition (CVPR), 2010 IEEE Conference on*. IEEE, 2010, pp. 239-246.

[40] D. Hu, L. Bo, and X. Ren, "Toward robust material recognition for everyday objects." in *BMVC*, vol. 13, 2011, p. 14.

[41] M. Cimpoi, S. Maji, and A. Vedaldi, "Deep convolutional filter banks for texture recognition and segmentation," *arXiv preprint arXiv:1411.6836*, 2014.

[42] S. Bell, P. Upchurch, N. Snavely, and K. Bala, "Material recognition in the wild with the materials in context database," *Computer Vision and Pattern Recognition (CVPR)*, pp. 3479-3487, 2015.

[43] C. Szegedy, W. Liu, Y. Jia, P. Sermanet, S. Reed, D. Anguelov, D. Erhan, V. Vanhoucke, and A. Rabinovich, "Going deeper with convolutions," in *The IEEE Conference on Computer Vision and Pattern Recognition (CVPR)*, June 2015.

[44] R. Achanta, A. Shaji, K. Smith, A. Lucchi, P. Fua, and S. Süsstrunk, "Slic superpixels compared to state-of-the-art superpixel methods," *IEEE transactions on pattern analysis and machine intelligence*, vol. 34, no. 11, pp. 2274-2282, 2012.

[45] J. Wang and M. M. Oliveira, "A hole-filling strategy for reconstruction of smooth surfaces in range images," in *Computer Graphics and Image Processing, 2003. SIBGRAPI 2003. XVI Brazilian Symposium on*. IEEE, 2003, pp. 11-18.

[46] J. Branch, F. Prieto, and P. Boulanger, "Automatic hole-filling of triangular meshes using local radial basis function," in *3D Data Processing, Visualization, and Transmission, Third International Symposium on*. IEEE, 2006, pp. 727-734.

[47] J. S. Bendat and A. G. Piersol, "The hilbert transform," *Random Data: Analysis and Measurement Procedures, Fourth Edition*, pp. 473-503, 1986.

[48] Y. Jia, E. Shelhamer, J. Donahue, S. Karayev, J. Long, R. Girshick, S. Guadarrama, and T. Darrell, "Caffe: Convolutional architecture for fast feature embedding," in *Proceedings of the 22nd ACM international conference on Multimedia*. ACM, 2014, pp. 675-678.

[49] V. Pulkki et al., *Spatial sound generation and perception by amplitude panning techniques*. Helsinki University of Technology, 2001.

[50] E. M. Wenzel, J. D. Miller, and J. S. Abel, "A software-based system for interactive spatial sound synthesis," in *ICAD, 6th Intl. Conf. on Aud. Disp*, 2000, pp. 151-156.

[51] S. Foster, "Impulse response measurement using golay codes," in *Acoustics, Speech, and Signal Processing, IEEE International Conference on ICASSP '86.*, vol. 11. IEEE, 1986, pp. 929-932.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining acoustic material properties associated with a real-world scene, the method comprising:
   obtaining an acoustic response in a real-world scene;
   obtaining images of the real-world scene;
   generating, using the images of the real-world scene, a three-dimensional (3D) virtual model of the real-world scene;
   determining acoustic material properties of surfaces in the 3D virtual model using a visual material classification algorithm to identify materials in the real-world scene that make up the surfaces and known acoustic material properties of the materials, wherein the visual material classification algorithm comprises:
      performing, using the images of the real-world scene and a convolutional neural network (CNN) based material classifier, a visual material segmentation, wherein the visual material segmentation indicates material classification probabilities for triangles associated with the 3D virtual model;
      identifying, using a patch segmentation algorithm, patches associated with the 3D virtual model, wherein each patch represents a localized group of triangles appearing to be the same material; and
      determining, using the material classification probabilities, material classifications for the patches, where each material classification is associated with predetermined acoustic material properties; and
      performing one or more acoustic simulations in the 3D virtual model using an optimization algorithm, wherein the optimization algorithm includes a sound propagation simulation phase for generating a simulated acoustic response based on the acoustic material properties and a material estimation phase for adjusting the acoustic material properties used in the sound propagation simulation phase, wherein the acoustic response in the real-world scene is used to adjust the acoustic material properties, wherein the optimization algorithm uses a solver to determine the adjustment for the acoustic material properties during the material estimation phase, wherein the optimization algorithm alternates between the phases until a simulated acoustic response of an acoustic simulation in the 3D virtual model is similar to the acoustic response in the real-world scene or until a termination condition is met; and
   generating, using the acoustic material properties of surfaces in the 3D virtual model, physically-based sound effects for the real-world scene.

2. The method of claim 1 wherein the acoustic simulation includes a sound propagation model based on a specular early diffraction method, a diffraction method, or a path tracing method.

3. The method of claim 1 wherein the simulated acoustic response is associated with a listener position and a source position that correspond to a listener position and a source position associated with the acoustic response in the real-world scene.

4. The method of claim 1 wherein the termination condition includes a predetermined number of iterations elapsing, if an average per-bin error is less than a predetermined value, or the optimization algorithm converging to a local minimum.

5. The method of claim 1 wherein the acoustic response in the real-world scene is obtained using at least one speaker to output sound and at least one microphone to record the sound.

6. The method of claim 1 wherein the acoustic material properties include frequency-dependent absorption coefficients.

7. A system for determining acoustic material properties associated with a real-world scene, the system comprising:
   at least one processor; and
   a sound propagation model (SPM) module executable by the at least one processor, wherein the SPM module is configured to obtain an acoustic response in a real-world scene, to obtain images of the real-world scene, to generate, using the images of the real-world scene, a three-dimensional (3D) virtual model of the real-world scene, to determine acoustic material properties of surfaces in the 3D virtual model using a visual material classification algorithm to identify materials in the real-world scene that make up the surfaces and known acoustic material properties of the materials, wherein the visual material classification algorithm comprises: performing, using the images of the real-world scene and a convolutional neural network (CNN) based material classifier, a visual material segmentation, wherein the visual material segmentation indicates material classification probabilities for triangles associated with the 3D virtual model; identifying, using a patch segmentation algorithm, patches associated with the 3D virtual model, wherein each patch represents a localized group of triangles appearing to be the same material; and determining, using the material classification probabilities, material classifications for the patches, where each material classification is associated with predetermined acoustic material properties, and to perform one or more acoustic simulations in the 3D virtual model using an optimization algorithm, wherein the optimization algorithm includes a sound propagation simulation phase for generating a simulated acoustic response based on the acoustic material properties and a material estimation phase for adjusting the acoustic material properties used in the sound propagation simulation phase, wherein the acoustic response in the real-world scene is used to adjust the acoustic material properties, wherein the optimization algorithm uses a solver to determine the adjustment for the acoustic material properties during the material estimation phase, wherein the optimization algorithm alternates between the phases until a simulated acoustic response of an acoustic simulation in the 3D virtual model is similar to the acoustic response in the real-world scene or until a termination condition is met; and generating, using the acoustic material properties of surfaces in the 3D virtual model, physically-based sound effects for the real-world scene.

8. The system of claim 7 wherein the acoustic simulation includes a sound propagation model based on a specular early diffraction method, a diffraction method, or a path tracing method.

9. The system of claim 7 wherein the simulated acoustic response is associated with a listener position and a source position that correspond to a listener position and a source position associated with the acoustic response in the real-world scene.

10. The system of claim 7 wherein the termination condition includes a predetermined number of iterations elapsing, if an average per-bin error is less than a predetermined value, or the optimization algorithm converging to a local minimum.

11. The system of claim 7 wherein the acoustic response in the real-world scene is obtained using at least one speaker to output sound and at least one microphone to record the sound.

12. The system of claim 7 wherein the acoustic material properties include frequency-dependent absorption coefficients.

13. A non-transitory computer readable medium having stored thereon executable instructions that when executed by a processor of a computer control the computer to perform steps comprising:
   obtaining an acoustic response in a real-world scene;
   obtaining images of the real-world scene;
   generating, using the images of the real-world scene, a three-dimensional (3D) virtual model of the real-world scene;
   determining acoustic material properties of surfaces in the 3D virtual model using a visual material classification algorithm to identify materials in the real-world scene that make up the surfaces and known acoustic material properties of the materials, wherein the visual material classification algorithm comprises:
      performing, using the images of the real-world scene and a convolutional neural network (CNN) based material classifier, a visual material segmentation, wherein the visual material segmentation indicates material classification probabilities for triangles associated with the 3D virtual model;
      identifying, using a patch segmentation algorithm, patches associated with the 3D virtual model, wherein each patch represents a localized group of triangles appearing to be the same material; and
      determining, using the material classification probabilities, material classifications for the patches, where each material classification is associated with predetermined acoustic material properties; and
   performing one or more acoustic simulations in the 3D virtual model using an optimization algorithm, wherein the optimization algorithm includes a sound propagation simulation phase for generating a simulated acoustic response based on the acoustic material properties and a material estimation phase for adjusting the acoustic material properties used in the sound propagation simulation phase, wherein the acoustic response in the real-world scene is used to adjust the acoustic material properties, wherein the optimization algorithm uses a solver to determine the adjustment for the acoustic material properties during the material estimation phase, wherein the optimization algorithm alternates between the phases until a simulated acoustic response of an acoustic simulation in the 3D virtual model is similar to the acoustic response in the real-world scene or until a termination condition is met and generating, using the acoustic material properties of surfaces in the 3D virtual model, physically-based sound effects for the real-world scene.

14. The non-transitory computer readable medium of claim 13 wherein the acoustic simulation includes a sound propagation model based on a specular early diffraction method, a diffraction method, or a path tracing method.

15. The non-transitory computer readable medium of claim 13 wherein the simulated acoustic response is associated with a listener position and a source position that correspond to a listener position and a source position associated with the acoustic response in the real-world scene.

* * * * *